US009222816B2

(12) United States Patent
Patel et al.

(10) Patent No.: US 9,222,816 B2
(45) Date of Patent: Dec. 29, 2015

(54) APPARATUS CONFIGURED TO DETECT GAS USAGE, METHOD OF PROVIDING SAME, AND METHOD OF DETECTING GAS USAGE

(75) Inventors: Shwetak N. Patel, Seattle, WA (US); Sidhant Gupta, Seattle, WA (US); Matthew S. Reynolds, Durham, NC (US)

(73) Assignee: Belkin International, Inc., Santa Monica, CA (US)

( * ) Notice: Subject to any disclaimer, the term of this patent is extended or adjusted under 35 U.S.C. 154(b) by 798 days.

(21) Appl. No.: 12/780,713

(22) Filed: May 14, 2010

(65) Prior Publication Data

US 2011/0282596 A1    Nov. 17, 2011

(51) Int. Cl.
| | | |
|---|---|---|
| H04B 15/00 | (2006.01) |
| G01F 1/66 | (2006.01) |
| F23K 5/00 | (2006.01) |
| F23N 5/16 | (2006.01) |
| F23N 5/18 | (2006.01) |

(52) U.S. Cl.
CPC . *G01F 1/66* (2013.01); *F23K 5/007* (2013.01); *F23N 5/16* (2013.01); *F23N 5/184* (2013.01); *F23K 2401/201* (2013.01); *F23N 2005/185* (2013.01)

(58) Field of Classification Search
CPC ..... G01F 1/66; F23K 5/007; F23K 2401/201; F23N 5/16; F23N 5/184; F23N 2005/185
USPC ........................................................ 702/190
See application file for complete search history.

(56) References Cited

U.S. PATENT DOCUMENTS

| | | | |
|---|---|---|---|
| 3,714,516 A | | 1/1973 | Howe |
| 4,088,436 A | * | 5/1978 | Alferes ........................... 431/21 |
| 4,612,617 A | | 9/1986 | Laplace, Jr. et al. |
| 4,858,141 A | | 8/1989 | Hart et al. |
| 5,027,644 A | | 7/1991 | Ziolkowski et al. |
| 5,058,437 A | | 10/1991 | Chaumont et al. |

(Continued)

FOREIGN PATENT DOCUMENTS

| | | |
|---|---|---|
| CA | 2254101 | 1/2005 |
| CN | 101529213 | 9/2009 |

(Continued)

OTHER PUBLICATIONS

Fisher Control International, inc., "Type S201 and S202 gas regulators," (1981).*

(Continued)

*Primary Examiner* — Hyun Park
(74) *Attorney, Agent, or Firm* — Bryan Cave LLP

(57) ABSTRACT

In some embodiments, an apparatus can be configured to detect gas usage. The apparatus can include: (a) a processing module configured to run on a computational unit; and (b) a sensing unit configured to be coupled to a gas regulator, the sensing unit having: (1) at least one acoustic sensor configured to detect two or more acoustic signals produced by the gas regulator and convert the two or more acoustic signals into one or more first data signals; and (2) a transmitter electrically coupled to the at least one acoustic sensor and configured to transmit the one or more first data signals to the computational unit. The processing module is configured to use the one or more first data signals to determine the gas usage. Other embodiments are disclosed.

25 Claims, 15 Drawing Sheets

(56) References Cited

U.S. PATENT DOCUMENTS

| | | | |
|---|---|---|---|
| 5,276,629 A | | 1/1994 | Reynolds |
| 5,390,542 A | * | 2/1995 | O'Rourke ............... 73/269 |
| 5,483,153 A | | 1/1996 | Leeb et al. |
| 5,590,179 A | | 12/1996 | Shincovich et al. |
| 5,717,325 A | | 2/1998 | Leeb et al. |
| 5,813,849 A | | 9/1998 | Schwartz et al. |
| 5,898,387 A | | 4/1999 | Davis et al. |
| 6,275,168 B1 | | 8/2001 | Slater et al. |
| 6,314,986 B1 | | 11/2001 | Zheng et al. |
| 6,816,078 B2 | | 11/2004 | Onoda et al. |
| 6,906,617 B1 | | 6/2005 | Van de Meulen |
| 7,019,666 B2 | | 3/2006 | Tootoonian Mashhad et al. |
| 7,498,935 B2 | | 3/2009 | Kodoma et al. |
| 7,656,649 B2 | | 2/2010 | Loy et al. |
| 2003/0014248 A1 | * | 1/2003 | Vetter ............... 704/226 |
| 2003/0097348 A1 | | 5/2003 | Cao |
| 2004/0061543 A1 | * | 4/2004 | Nam et al. ............ 327/342 |
| 2006/0064254 A1 | | 3/2006 | Morrow et al. |
| 2006/0077046 A1 | | 4/2006 | Endo |
| 2007/0072137 A1 | | 3/2007 | Peluso et al. |
| 2008/0302172 A1 | | 12/2008 | Kates |
| 2009/0045804 A1 | | 2/2009 | Durling et al. |
| 2009/0072985 A1 | | 3/2009 | Patel et al. |
| 2009/0271128 A1 | * | 10/2009 | Umekage et al. ......... 702/45 |
| 2010/0030393 A1 | | 2/2010 | Masters et al. |
| 2010/0070214 A1 | | 3/2010 | Hyde et al. |
| 2010/0070218 A1 | | 3/2010 | Hyde et al. |
| 2010/0188262 A1 | | 7/2010 | Reymann et al. |
| 2011/0004421 A1 | | 1/2011 | Rosewell et al. |

FOREIGN PATENT DOCUMENTS

| | | |
|---|---|---|
| EP | 1136829 | 9/2001 |
| FR | 2645968 A | 10/1990 |
| GB | 2393514 | 3/2004 |
| JP | 02134515 | 5/1990 |
| JP | 02194322 | 7/1990 |
| JP | 05067283 | 3/1993 |
| JP | 08-178195 A | 7/1996 |
| JP | 8178185 | 7/1996 |
| JP | H8-178195 A | 7/1996 |
| JP | 11287692 | 10/1999 |
| JP | 2004191103 | 7/2004 |
| JP | 2006057549 | 3/2006 |
| KR | 10-1999-0062571 A | 7/1999 |
| WO | 9304377 | 3/1993 |
| WO | 2008-117531 A1 | 10/2008 |
| WO | 2010007369 | 1/2010 |

OTHER PUBLICATIONS

Jury, "Fundamentals of Gas Pressure Regulation," Fisher Control International, inc., (1972).*

Mitome et al., JP 2004-191103 (Machine translated version).*

Mizukoshi et al., JP 2006-153836 (Machine translated version).*

Drenker et al., Nonintrusive Monitoring of Electrical Loads, IEEE Xplore, 5 pages. Oct. 1999.

Hart, Nonintrusive Appliance Load Monitoring, IEEE Xplore, 22 pages. Dec. 1992.

Murata et al., Estimation of Power Consumption for Household Electric Appliances, Proceedigns of the 9th International Conference on Neural Informatin Processing (ICONIP'02), vol. 6, 5 pages. 2002.

Prudenzi, A Neuron Nets Based Procedure for Identifying Domestic Appliances Pattern-of-Use from Energy Recordings at Meter Panel, IEEE, 6 pages. 2002.

Laughman et al., Power Signature Analysis, IEEE, 8 pages. Mar./Apr. 2003.

PCT search report for PCT/US2011/034643, 13 pages.

\* cited by examiner

100

735

900

Raw audio signal with broadband
noise detection.

Step change detector.

The linearity curve obtained from calibrating using the gas meter and appliance ratings as ground truth The linearity curve obtained from plotting observed step increases vs. expected increases in the acoustic signal.

1400 Flow rate sensed from a calibrated during a typical test deployment

1500 Flow rate sensed from a calibrated during a typical test deployment

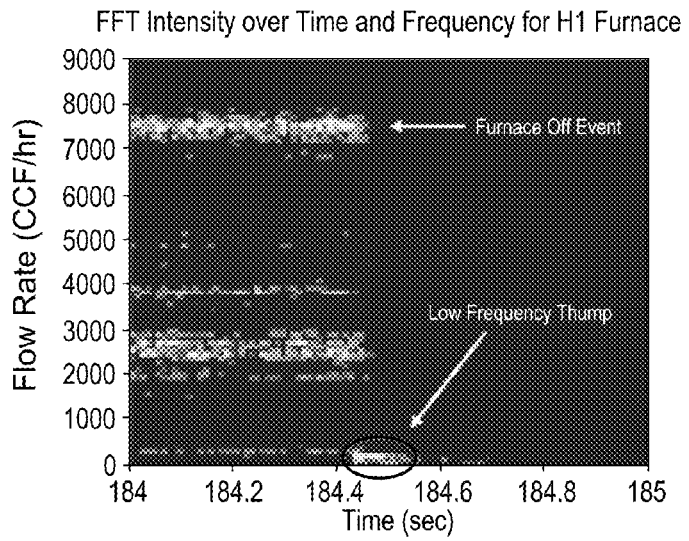

FIG. 16 An example of a low frequency thump caused by the ignition module in a gas furnace.

| House ID / Gas Type | Style / Built | Size / Floors | Furnace / Water Heater / Stove | Fireplace / Misc |
|---|---|---|---|---|
| H1 Natural Gas | Single-Family 1996 | 3400 sq. ft. 2 | Yes / Yes / 4 burners | 2 Manual Start |
| H2 Natural Gas | Single-Family 1998 | 3600 sq. ft. 2 | Yes / Yes / 4 burners | 2 Electric Start |
| H3 Natural Gas | Single-Family 1962 | 2000 sq. ft. 1 | Yes / No / No | 1 Manual Start / Pool Heater |
| H4 Natural Gas | Single-Family 2003 | 2900 sq. ft. 2 | Yes / Yes / 6 burners | 1 Electric Start |
| H5 Propane | Single-Family 1991 | 2100 sq. ft. 2 | Yes / Yes / 4 burners | 1 Electric Start |
| H6 Natural Gas | Single-Family ~1960's | 1080 sq. ft. 1 | Yes / Yes / 4 burners | No |
| H7 Natural Gas | Single-Family 1994 | 3360 sq. ft. 2 | Yes / Yes / 4 burners | 1 Manual Start |
| H8 Natural Gas | Single-Family 1991 | 3000 sq. ft. 2 | Yes / Yes / 4 burners | 1 Manual Start |
| H9 Natural Gas | Single-Family 1997 | 2600 sq. ft. 2 | Yes / Yes / 4 burners | 1 Electric Start |

FIG. 17 Table 1: Demographic data for homes used in our data collection experiments and their available appliances tested.

| Home (N=# of gas events collected) | Events Detected | 10-Fold Cross Validation Classification Results | Classification Results Using Minimal Training Set |
|---|---|---|---|
| H1 (N=72) | 100% | 93.05% | 88.24% |
| H2 (N=87) | 100% | 97.70% | 99.05% |
| H3 (N=24) | 100% | 100% | 100% |
| H4 (N=102) | 100% | 95.07% | 98.34% |
| H5 (N=50) | 84% | 85.71% | 86.12% |
| H6 (N=22) | 100% | 100% | 83.34% |
| H7 (N=32) | 100% | 100% | 100% |
| H8 (N=58) | 100% | 87.75% | 80.98% |
| H9 (N=49) | 100% | 96.55% | 49.8% |
| Aggregate (N=496) | 98.22% | 95.09% | 87.32% |

Table 2: Overall performance of event detection and classification categorized by home.

*FIG. 18*

| Appliance Type (N=# of gas events collected) | 10-Fold Cross Validation Classification Results | Classification Results Using Minimal Training Set | |
|---|---|---|---|
| | | Appliance On | Appliance Off |
| Furnace (N=108) | 98.13% | 100% | 98.5% |
| Water Heater (N=88) | 93.02% | 100% | 76.1% |
| Stove (N=206) | 97.56% | 96.8% | 84.8% |
| Fireplace (N=88) | 91.66% | 100% | 93.2% |
| PoolHeater (N=6) | 100% | 100% | 100% |
| Aggregate (N=496) | 96.07% | 99.36% | 90.52% |

Table 3: Overall performance of event detection and classification categorized by fixture.

FIG. 19

APPARATUS CONFIGURED TO DETECT GAS USAGE, METHOD OF PROVIDING SAME, AND METHOD OF DETECTING GAS USAGE

FIELD OF THE INVENTION

This invention relates generally to apparatuses and methods for infrastructure mediated sensing, and relates more particularly to apparatuses for detecting gas usage, methods of providing the same, and methods of detecting gas usage.

DESCRIPTION OF THE BACKGROUND

Natural gas is the most widely consumed energy source in American homes. It is used for furnaces, water heaters, stoves, fireplaces, pool heaters, and, in some cases, clothes dryers. In the United States, natural gas prices have quadrupled over the past decade due to growing demand and limited pipeline capacity. As a result, government agencies and gas utilities have scrambled to implement conservation programs to reduce demand and better help customers manage energy costs. In areas where natural gas is not provided by utility pipelines, propane tanks are commonly used to provide gas service to a particular home, building, or group of building. Although recent research work has focused on sensing electricity and water usage in the home, little attention has been directed towards sensing natural or propane gas usage.

Unlike electricity and water usage, which are often the result of direct human actions such as watching TV, doing laundry, or taking a shower, gas usage is dominated by automated systems like the furnace or hot water heater. This disconnect between activity and consumption leads to a lack of consumer understanding about how gas is used in the home and, in particular, which appliances are most responsible for this usage. Most people simply have no means of judging their household gas consumption other than a monthly bill, which, even then, does not provide itemized details about what accounts for this consumption.

Given the small number of natural gas or propane appliances in each home, it is tempting to consider a distributed direct sensing approach for sensing gas usage (e.g., installing a flow sensor behind each appliance). There are three potential challenges with this approach: first, it requires constructing sensors that are flexible and robust enough to fit a variety of pre-existing gas appliance models in a noninvasive way; second, it inherently involves multiple sensors, which increases the cost and the technical complexity of deployment; and finally, natural gas and propane are highly combustible compounds, so a sensing approach must be safe and, preferably, not require the help of a professional for installation. Available gas usage sensors do not meet these challenges. The existing gas usage sensors can lack flexibility to be used with a variety of gas appliances can be complex and costly to install and maintain, and usually require professional installation.

Accordingly, a need or potential for benefit exists for an apparatus or method that can provide detailed information about gas usage in a home or other structure but also is relatively inexpensive to deploy and does not require professional installation.

BRIEF DESCRIPTION OF THE DRAWINGS

To facilitate further description of the embodiments, the following drawings are provided in which:

FIG. 16 illustrates a graph of frequency versus time showing a low frequency thump cause by an exemplary gas furnace during an exemplary deployment of an exemplary gas sensing device, according to an embodiment;

FIG. 17 illustrates a table of demographic data for structures used in an exemplary deployment of an exemplary gas sensing device, according to an embodiment;

FIG. 18 illustrates a table showing the performance of an exemplary gas sensing device during an exemplary deployment, according to an embodiment;

FIG. 19 illustrates another table showing the performance of an exemplary gas sensing device during an exemplary deployment, according to an embodiment;

Figure 1:
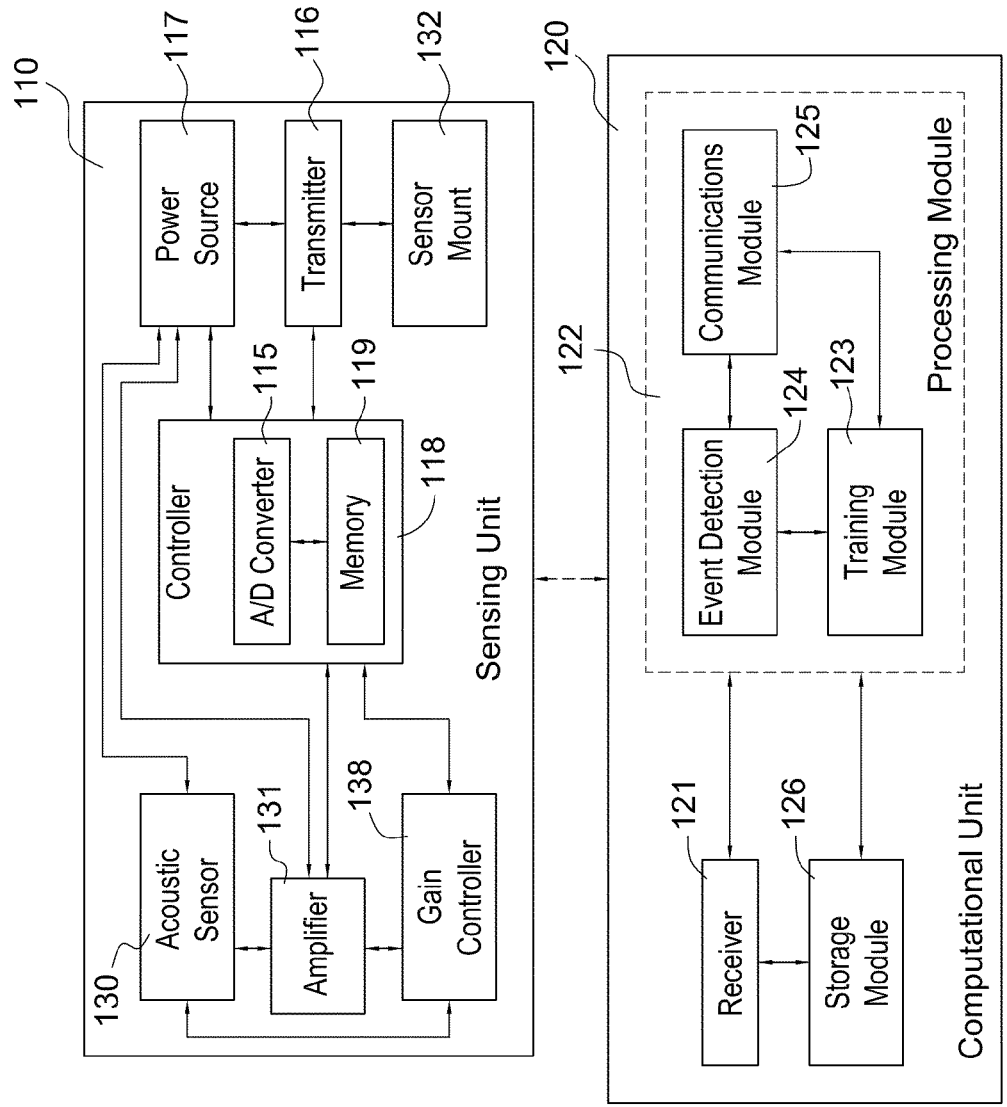
FIG. 1 illustrates a block view of a gas sensing device, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable. "Acoustic signals," as used herein, can include audible signals (20 Hertz (Hz) to 15 kilohertz (kHz)), sub-audible (below 20 Hz) signals, or ultrasonic (above 15 kHz) signals.

DETAILED DESCRIPTION OF EXAMPLES OF EMBODIMENTS

In some embodiments, an apparatus can be configured to detect gas usage. The apparatus can include: (a) a processing module configured to run on a computational unit; and (b) a sensing unit configured to be coupled to a gas regulator, the sensing unit having: (1) at least one acoustic sensor configured to detect two or more acoustic signals produced by the gas regulator and convert the two or more acoustic signals into one or more first data signals; and (2) a transmitter electrically coupled to the at least one acoustic sensor and configured to transmit the one or more first data signals to the computational unit. The processing module is configured to use the one or more first data signals to determine the gas usage.

Still other embodiments concern a method of detecting usage of a gas in a building. The building can have a gas regulator with a pressure relief vent. The method can include: using at least one acoustic sensor to receive one or more first acoustic signals from the pressure relief vent of the gas regulator; converting the one or more first acoustic signals into one or more first electrical signals; and determining a first gas flow using the one or more first electrical signals.

Other embodiments concern a method of providing a gas sensing device. The method can include: providing at least one acoustic sensor configured to detect two or more acoustic signals in a gas regulator and to convert the two or more acoustic signals into the one or more first data signals; providing a transmitter configured to transmit the one or more first data signals; electrically coupling the transmitter to the at least one acoustic sensor; providing a sensor mount configured to mechanically couple to the gas regulator; mechanically coupling the at least one acoustic sensor and the transmitter to the sensor mount; and providing a processing module configured to run on a computational unit, the processing module having an event detection module configured to use the one or more first data.

In yet other embodiments, a gas regulator unit can include: (a) a gas regulator having: (1) a gas inlet; (2) a diaphragm chamber configured to control an amount of gas flowing through the gas regulator; (3) a relief valve coupled to the diaphragm chamber; and (4) a relief vent coupled to the relief valve; (b) at least one acoustic sensor configured to detect two or more acoustic signals in the gas regulator and convert the two or more acoustic signals into one or more first data signals, the at least one acoustic sensor is located at the gas regulator; and (c) a processing module configured to run on a computational unit. The processing module can be configured to use the one or more first data signals to determine gas usage by one or more gas appliances.

Figure 3:
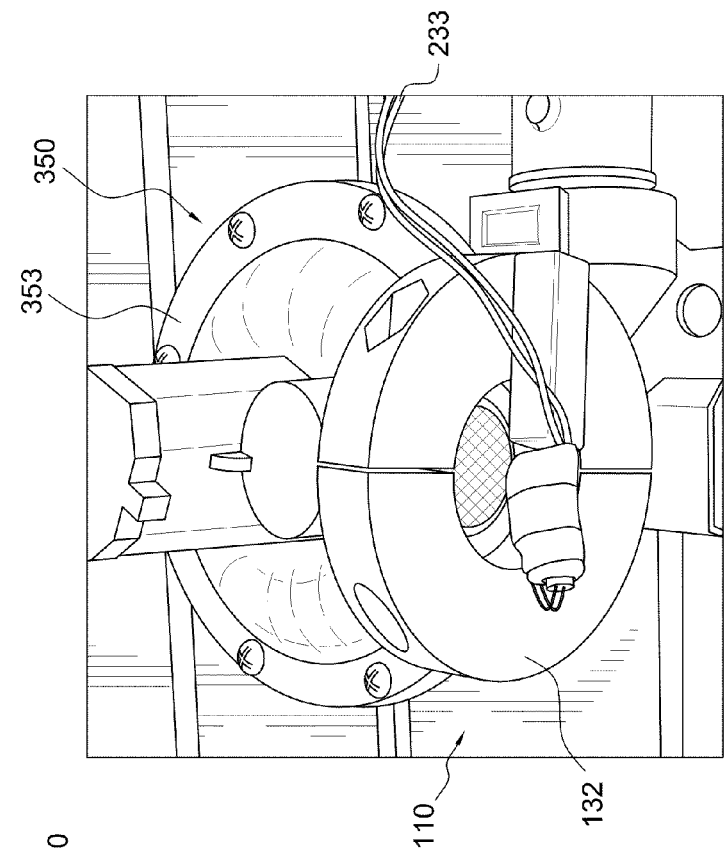
FIG. 3 illustrates an example of the sensing unit of FIG. 2 coupled to a gas regulator, according to the first embodiment.
Figure 2:
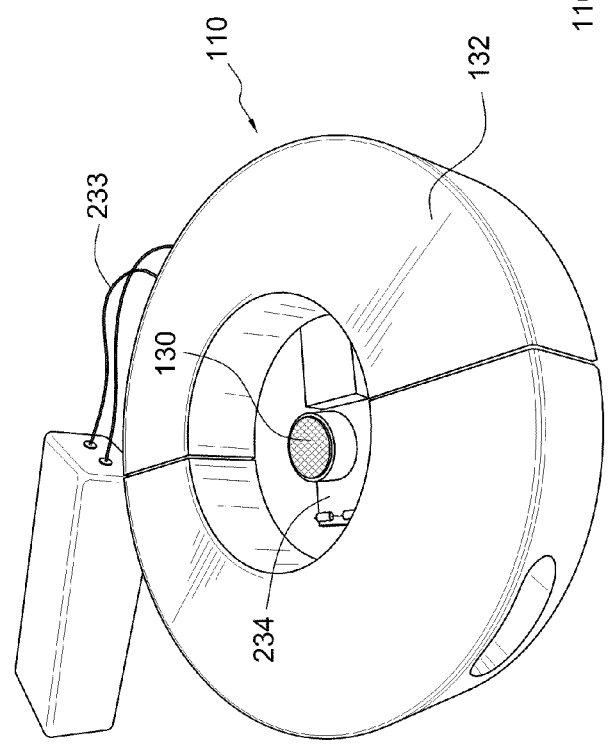
FIG. 2 illustrates an example of a sensing unit of the gas sensing device of FIG. 1, according to the first embodiment.
Figure 4:
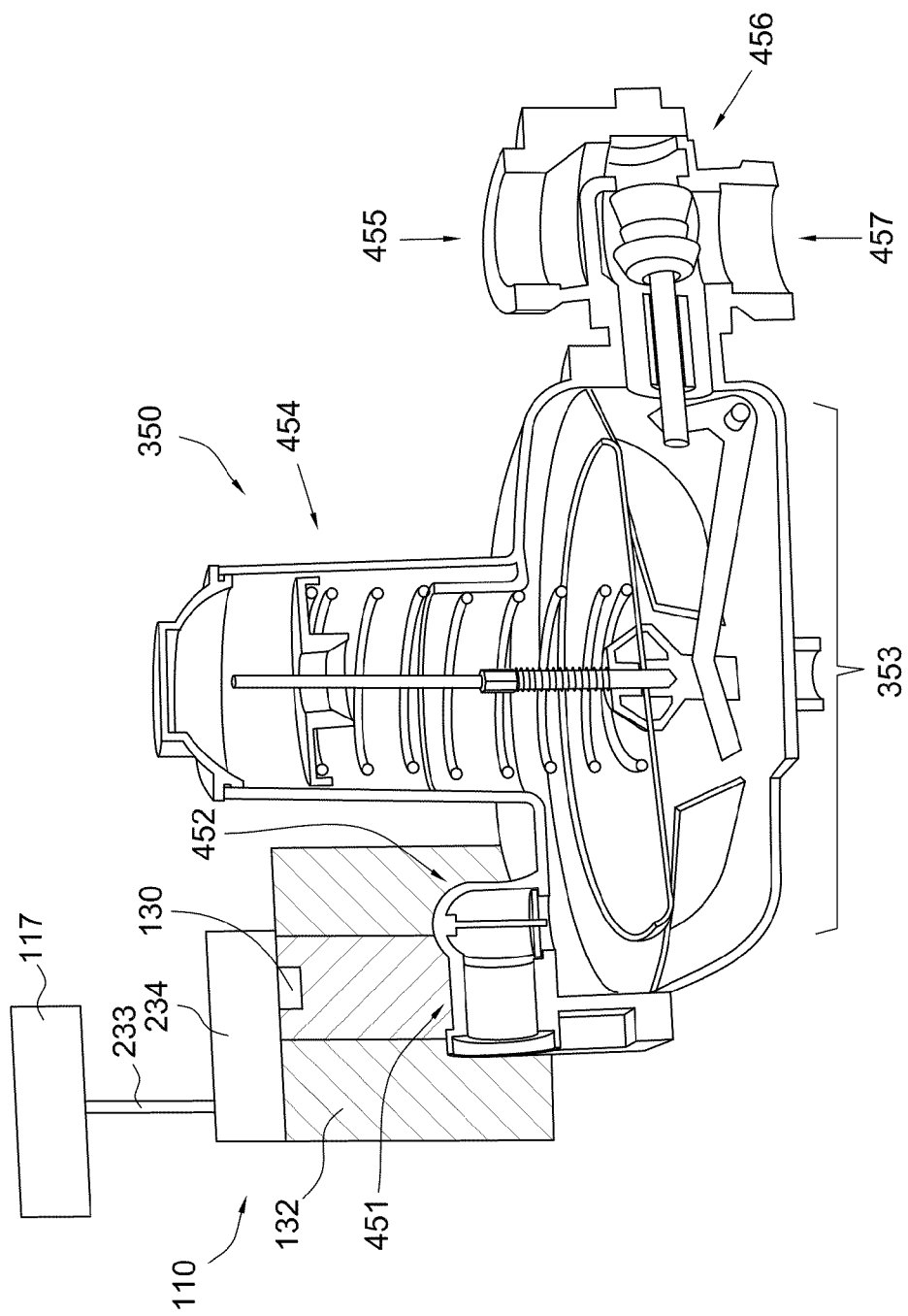
FIG. 4 illustrates a cross-sectional view of the sensing unit of FIG. 2 coupled to the gas regulator of FIG. 3, according to the first embodiment.

Turning to the drawings, FIG. 1 illustrates a block view of gas sensing device 100, according to a first embodiment. FIG. 2 illustrates an example of sensing unit 110 of gas sensing device 100, according to the first embodiment. FIG. 3 illustrates an example of sensing unit 110 of gas sensing device 100 coupled to gas regulator 350, according to the first embodiment. FIG. 4 illustrates a cross-sectional view of sensing unit 110 coupled to gas regulator 350, according to the first embodiment. Gas sensing device 100 is merely exemplary and is not limited to the embodiments presented herein. Gas sensing device 100 can be employed in many different embodiments or examples not specifically depicted or described herein.

Previous work in home sensing has been motivated by one of two independent concerns: (1) human activity sensing for assisted care environments (e.g., elder care monitoring); or (2) enabling highly detailed ecofeedback applications to reduce wasteful consumption practices. Although automatically identifying gas usage in the home may indeed provide insights into corresponding human activities (e.g., stove use indicates cooking, long hot water use indicates showering), a large majority of gas use stems from automated mechanical systems (e.g., from a home's furnace and water heater), which may or may not directly correspond to a human's current activity. Thus, a primary focus of gas sensing is in supporting the second concern, which is, enabling new types of ecofeedback about gas usage in the home. Such feedback can come in the form of redesigned bills, home internet portals, or ambient home displays. One element of such feedback provides utilities and consumers with sensing data that is not only an aggregate number, but also an itemized breakdown of gas usage down to its source. This detailed data should allow residents to make informed decisions about the costs and benefits of how they consume gas in their home (e.g., the temperature settings on their hot water heater, using hot water in the clothes washer).

Gas sensing device 100 can help to eliminate the knowledge gap about the gas usage in a home or other structure by providing highly granular information about gas usage in a home or other structure. Gas sensing device 100 can be a low-cost, single-point sensing solution that uses changes in acoustic intensities of gas events to automatically identify gas use down to its source (e.g., water heater, furnace, or fireplace) and that provides estimates of gas flow. Each gas device in the home draws a unique amount of gas when activated, and the flow rate-of-change is based on the type of appliance and, to some extent, its location in the home (i.e., the pipe pathway to the gas appliance). Accordingly, gas sensing device 100 can automatically classify gas use down to its source based on flow volume and rate-of-change.

Because gas sensing device 100 analyzes the acoustic signatures of gas events, it does not require direct contact with the gas itself to perform its measurements and calculations. This lack of direct contact is in contrast to traditional gas sensing approaches, which provide only aggregate measurements of usage, require in-line contact with the gas to operate, and usually, also require professional installation.

As illustrated in FIGS. 1 and 2, an apparatus for sensing gas usage or gas sensing device 100 can include: (a) sensing unit 110; and (b) a computational unit 120. Sensing unit 110 can include: (a) at least one acoustic sensor 130 configured to detect acoustic signals and convert the acoustic signals into data signals; (b) at least one amplifier 131 (for example, an operational amplifier or op-amp) coupled to an output of acoustic sensor 130; (c) at least one controller 118 with memory 119 and an analog-to-digital (A/D) converter 115; (d) a power source 117; (e) at least one transmitter 116 electrically coupled to acoustic sensor 130 and configured to transmit the data signals to computational unit 120; and (f) a sensor mount.

In some examples, gas sensing device 100 can also include a gain controller 138 to automatically reduce the amplification gain of the acoustic signals detected by acoustic sensor 130 if distortion occurs. Gain controller 138 can also be used to automatically reduce the amplification gain if amplifier or A/D converter distortion occurs. In the same or different examples, A/D converter 115 and/or memory 119 can be separate from controller 118; and/or amplifier 131 and/or gain controller 138 can be part of controller 118. In another embodiment one or more of these elements are combined into a single integrated circuit. In a further embodiment acoustic sensor is implemented on the same integrated circuit as some or all of the other elements by means of micro-electromechanical system (MEMS) techniques.

Computational unit 120 can include: (a) a transceiver or receiver 121; (b) a processing module 122; and (c) a storage module 126. In some examples, processing module 122 can include: (a) a training module 123 configured to train processing module 122 to correlate gas usage by specific appliances with acoustic signals received by acoustic sensor 130; (b) an event detection module 124 configured to associate acoustic signals received with usage of gas by at least one specific appliance; and (c) a communications module 125 configured to communicate with a user. As an example, processing module 122 can be one or more software programs. Receiver 121 can be configured to receive data signals from transmitter 116.

In a natural gas infrastructure, gas is delivered to homes and other structures through a pressurized piping infrastructure. High-pressure transmission pipelines move gas from the production company's cleaning plants to gas distribution stations. Regulators and control valves control the high-pressure gas as it moves along the pipeline. At city gate stations, gas regulators reduce the pipeline gas pressure to distribution pressure. To provide a constant, measurable gas pressure, gas regulators control the gas pressure just before it enters the gas meter and into the home. In the case of propane, the gas is stored in an on-site tank, and enters the home or building through one or more pressure regulators, as propane is typically unmetered between the local propane storage tank and the home or building.

Gas regulators are mandated by US national code (ANSI code B109.4-1998) to deliver safe pressure levels to the home's piping system. Given these government regulations, there is a reasonable level of expectation that the gas regulators are both consistent and present across homes and other structures.

FIGS. 3 and 4 show an exemplary gas regulator 350. As shown in FIGS. 3 and 4, gas regulator 350 can include: (a) diaphragm chamber 353; (b) a regulator control 454; (c) a gas inlet 455; (d) a gas flow valve 456; (e) a gas outlet 457; (f) a breather or relief valve 452; and (g) a relief vent 451.

Diaphragm chamber 353 can include a spring-loaded case that controls the amount of gas flow. If diaphragm chamber 353 senses high or low pressure changes, it adjusts accordingly to restrict or increase gas flow. As an added safety feature, relief valves 452 exist to vent gas harmlessly if a gas line becomes over-pressurized or if gas regulator 350 malfunctions. Relief valve 452 is coupled to diaphragm chamber 353 and expels the gas through relief vent 451 (e.g., an external steel tube). When gas is being consumed by one or more appliances, it is possible to hear the gas flowing through gas regulator 350 at gas flow valve 456, which typically sounds like a slight hissing noise. This acoustic signal is amplified by diaphragm chamber 353, which acts as a resonant cavity.

Gas flow can be sensed through gas flow valve 456 via acoustic sensor 130 placed adjacent to relief vent 451. That is, sensing unit 110 can be configured to be coupled to pressure relief vent 451 of a gas regulator 350. Alternatively, acoustic sensor 130 may be placed in direct physical contact with the gas regulator 350 by means of mechanical coupling to diaphragm chamber 353 or relief vent 451. In this case, acoustic signals are carried as mechanical vibrations in the materials comprising the gas regulator 350 and are transduced directly by the acoustic sensor 130 rather than passing through an open-air gap.

Although an acoustic sensor may seem like a rather indirect way of measuring gas flow, it has several theoretical foundations. First, for a fixed chamber, the resonant frequency is also fixed, determined entirely by the size of the chamber. This relationship is analogous to resonance in a whistle—even when a person blows harder into a whistle, the person does not change the pitch, just the intensity of the sound. Second, greater flow through a tube can only result from greater pressure at one end of the tube. If the flow of gas inside the tube is laminar, the relationship between the pressure exerted at the tube ending is linearly related to the flow through the tube. Moreover, this pressure, which is proportional to flow, manifests as the amplitude of the resonant frequency, and is ideally suited for measurement via acoustic sensor 130. Relief vent 451 is the only opening in diaphragm chamber 353 for which the acoustic signals propagates outward into the environment, making it ideally suited for sensor placement, although alternative placement of microphone or acoustic sensor 130 in other locations on or near the gas regulator 350 are also contemplated. Additionally, as previously mentioned, acoustic signal coupling through the air or directly through mechanical conduction through the materials comprising the gas regulator 350 are also contemplated. With proper filtering and de-noising techniques, this acoustic signal can be isolated and calibrated to reflect aggregate gas flow, even in the presence of ambient noise.

Referring to FIGS. 1-4, acoustic sensor 130 can be configured to receive acoustic signals and convert the acoustic signals into data signals. In some examples, acoustic sensor 130 can be an omni-directional microphone. In other examples, acoustic sensor 130 can be a uni-directional microphone. In other examples, acoustic sensor 130 can include at least one of the following: an electric microphone, a piezoelectric sensor, an acousto-electric transducer, a micro-electromechanical sensor, or an ultrasonic microphone. In the same or different examples, acoustic sensor 130 can have a sensitivity of −44 decibels (dB) over the frequency range 100 Hertz (Hz) to 10 kilohertz (kHz). In some embodiments, an acoustic sensor with an op-amp with a higher dynamic range can be used to produce a more linear amplitude response. In other embodiments acoustic sensor 130 are mechanically coupled to one or more components of the gas regulator 350 and the inherent direct coupling of the acoustic signals produced by the gas regulator 350 yields a higher signal-to-noise ratio than other embodiments involving an air gap between gas regulator 350 and acoustic sensor or microphone 130.

In addition, in various embodiments, gas sensing device 100 also can include a second acoustic sensor (not shown in FIG. 3 or 4) that is near the main acoustic sensor, but not adjacent to vent 451 of gas regulator 350. This second acoustic sensor can record the background noise, and can be used for noise cancellation. Noise cancelling can dramatically increase the signal to noise ratio, and allow gas sensing device 100 to measure extremely quiet hissing from gas regulator 350.

Acoustic sensor 130 can be attached to a small printed circuit board (PCB) 234. PCB 234 can include amplifier 131 (FIG. 1) to amplify the data signals in some examples. Amplifier 131 can be configured to amplify the data signals from acoustic sensor 130 and pass the amplified data signals to controller 118 (FIG. 1).

PCB 234 is attached to a sensor mount 132, which can fit over the end or proximate to the relief vent 451 of gas regulator 350. Sensor mount 132 can ensure that acoustic sensor 130 is secured, level, and centered directly under relief vent 451 and also can protect acoustic sensor 130 from wind, rain, and dust. FIGS. 3 and 4 show sensing unit 110 mounted to gas regulator 350. In other examples, other mounting devices can be used to couple sensing unit 110 to gas regulator 350. In the examples shown in FIGS. 2-4, power source 117 (FIG. 1) is coupled to PCB 234 with wires 233. In various embodiments, power source 117 can include one or more batteries for providing power to the rest of sensing unit 110. In a different embodiment, power source 117 also can include a solar panel to recharge the one or more batteries.

In some examples, controller 118 (FIG. 1) can be mounted on PCB 234 and configured to receive data signals from acoustic sensor 130. In some examples, controller 118 can control sensing unit 110 and perform some processing of the data signals (e.g., converting the data signals from analog signals to digital signals using A/D converter 115) before communicating the data signals to computational unit 120 via transmitter 116 (FIG. 1).

Returning to FIG. 1, transmitter 116 can be mounted on PCB 234 and can be electrically coupled to amplifier 131, acoustic sensor 130, and/or controller 118. In some examples, transmitter 116 communicates the data signals to receiver 121 of computational unit 120. In some examples, transmitter 116 can be a wireless transmitter, and receiver 121 can be a wireless receiver. In some examples, electrical signals can be transmitted using WI-FI (wireless fidelity), the IEEE (Institute of Electrical and Electronics Engineers) 802.11 wireless protocol, or the Bluetooth 3.0+HS (High Speed) wireless protocol. In other examples, the Zigbee (IEEE 802.15.4) or Z-Wave wireless protocols may be employed. In other examples, transmitter 116 can transmit electrical signals Computational unit 120 can be configured to use the data signals from acoustic sensor 130 to determine the gas usage. In some examples, computational unit 120 can be configured to determine the total gas usage by the home or other building. In the same or different examples, computational unit 120 is configured to determine the gas usage by one or more of the gas appliances in the home or other structure.

"Computational Unit 120," as used herein, can refer to a single computer, single server, or a cluster or collection of computers and/or servers. In some examples, computational unit 120 can be local to the user. In other examples, the user or the gas sensing device 100 can access computational unit 120 through the Internet or other networks.

In some examples, computational unit 120 can be a home computer of the user of gas sensing device 100 or a computer owned by the owner of the structure in which gas sensing device 100 is installed. In other examples, a first server or computer (e.g., a home computer) can include a first portion of receiver 121, storage module 126, training module 123, event detection module 124, and communications module 125. One or more second servers (e.g., a computer or server owned or operated by or on behalf of the manufacturer of gas sensing device 100) can include a second, possibly overlapping, portion of these modules. In these examples, computational unit 120 can comprise the combination of the first computer and the one or more second servers. In some examples, storage module 126 can store the correlation information between specific data signals (i.e., acoustic signals) with usage of gas by specific appliances.

Event detection module 124 can determine: (a) the total amount of gas being used and (b) the specific appliance using the gas, and if more than one gas appliance is active at a time, the amount of gas being used by each of the appliances. In some examples, event detection module 124 can utilize a three-step approach to transform the data signals from acoustic sensor 130 into gas flow estimates and infer appliance-level activity. First, event detection module 124 can cleanse the raw acoustic signal datasets from sensing unit 110 using, for example, Fourier transforms and/or band pass filtering. In some examples, the cleansing can remove signals caused by environmental noise. Second, event detection module 124 uses a mathematical model of the relationship between acoustic intensity and gas flow to estimate the amount of gas usage. Finally, event detection module 124 can calculate the gas flow volume and rate-of-change, which are used to classify the appliance consuming gas.

Figure 14:
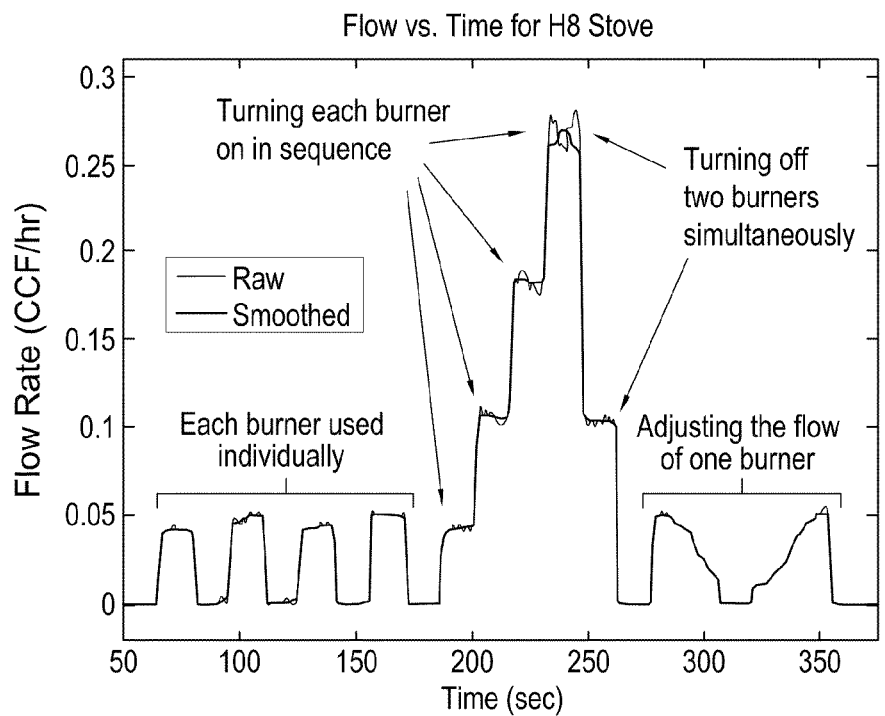
FIG. 14 illustrates a graph of flow rate versus time during an exemplary deployment of an exemplary gas sensing device, according to an embodiment.

Training module 123 can be configured to correlate specific acoustic signals with specific events at specific locations. For example, training module 123 can be configured to determine that the event shown in FIG. 14 is usage of a gas stove.

In some examples, training module 123 can be configured to perform a training or calibration sequence to correlate acoustic signals detected by acoustic sensor 130 with specific events at specific locations. After performance of the calibration sequence, training module 123 can provide the training correlation data to event detection module 124 so that event detection module 124 can correlate the acoustic signals detected by acoustic sensor 130 with specific movement events at specific locations based on the training correlation data. Training or calibration sequences are described in relation to an activity 735 of method 700 in FIG. 7.

Communications module 125 can be used to communicate information to and receive information from one or more users of gas sensing device 100. For example, a user can use communications module 125 to enter information during a training or calibration sequence. Additionally, communications module 125 can inform a user when a gas usage event occurs. In some embodiments, communications module 125 can use monitor 2006, keyboard 2004, and/or mouse 2010 of FIG. 20.

Figure 5:
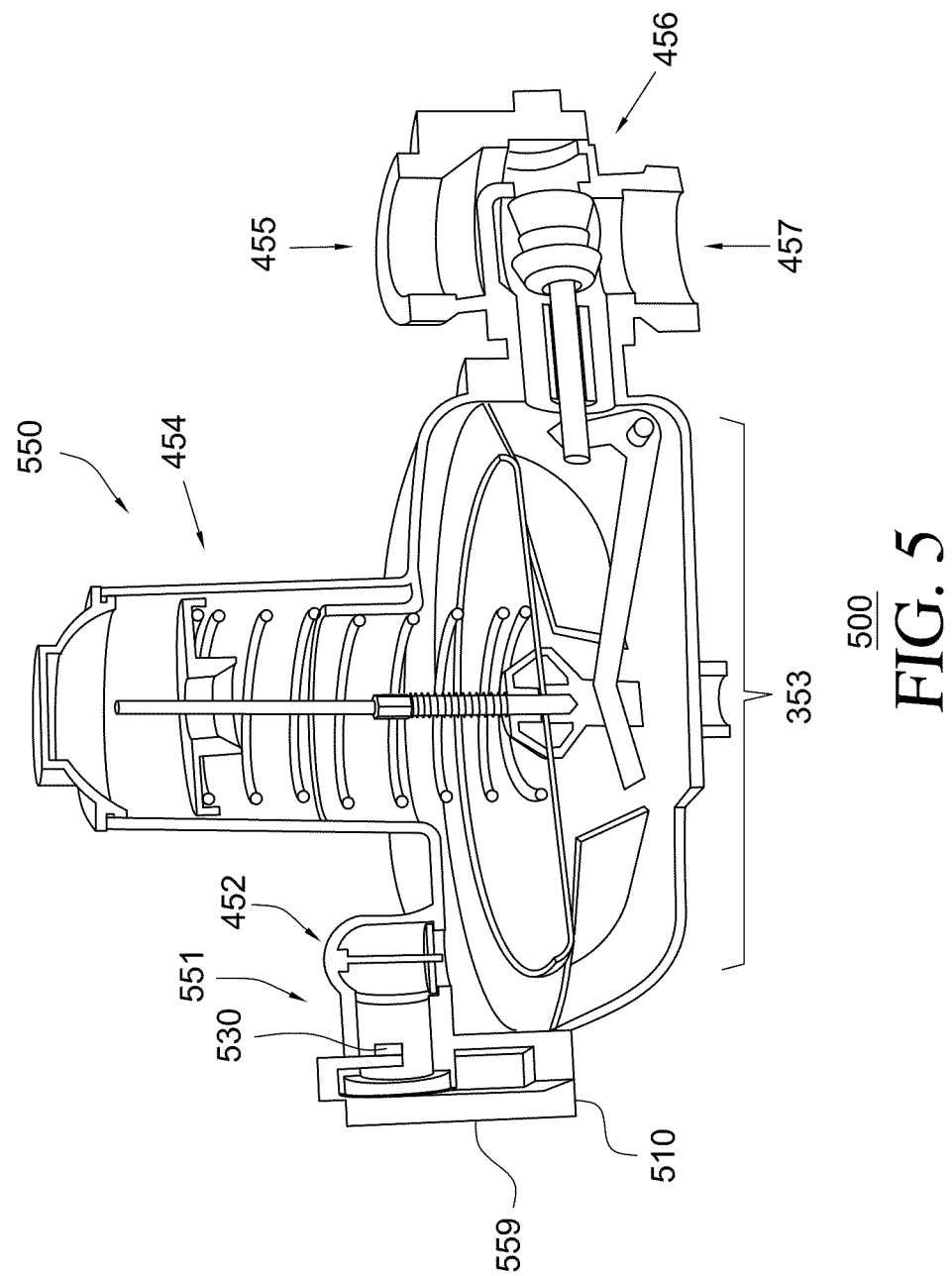
FIG. 5 illustrates an implementation of an exemplary gas regulator unit, according to a second embodiment.

Turning to another embodiment, FIG. 5 illustrates an implementation of sensing unit 510 in an exemplary gas regulator unit 500, according to a second embodiment. Gas regulator unit 500 is merely exemplary and is not limited to the embodiments presented herein. Gas regulator unit 500 can be employed in many different embodiments or examples not specifically depicted or described herein.

In the example illustrated in FIG. 5, gas regulator unit 500 includes: (a) a gas regulator 550; (b) sensing unit 510; and (c) computational unit 120 (FIG. 1). In this example, sensing unit 510 is integral with and/or permanently coupled to gas regulator 550.

Sensing unit 510 can be similar to sensing unit 110 of FIG. 1 and can include: (a) at least one acoustic sensor 530 configured to detect acoustic signals in gas regulator 550 and convert the acoustic signals into one or more first data signals; (b) at least one amplifier 131 (FIG. 1) coupled to an output of acoustic sensor 530; (c) at least one controller 118 (FIG. 1); (d) power source 117 (FIG. 1); (e) transmitter 116 (FIG. 1) electrically coupled to acoustic sensor 530; and (f) a sensor mount 559.

Gas regulator 550 can include: (a) diaphragm chamber 353; (b) regulator control 454; (c) gas inlet 455; (d) gas flow valve 456; (e) a gas outlet 457; (f) breather or relief valve 452; and (g) relief vent 551.

In this example, acoustic sensor 530 can be coupled to and located inside relief vent 551. Transmitter 116, power source 117, and amplifier 131 can be located in sensor mount 559 coupled to gas regulator 550. In other examples, acoustic sensor 530 can be located in at least one of diaphragm chamber 353, gas outlet 457, or gas inlet 455.

Figure 6:
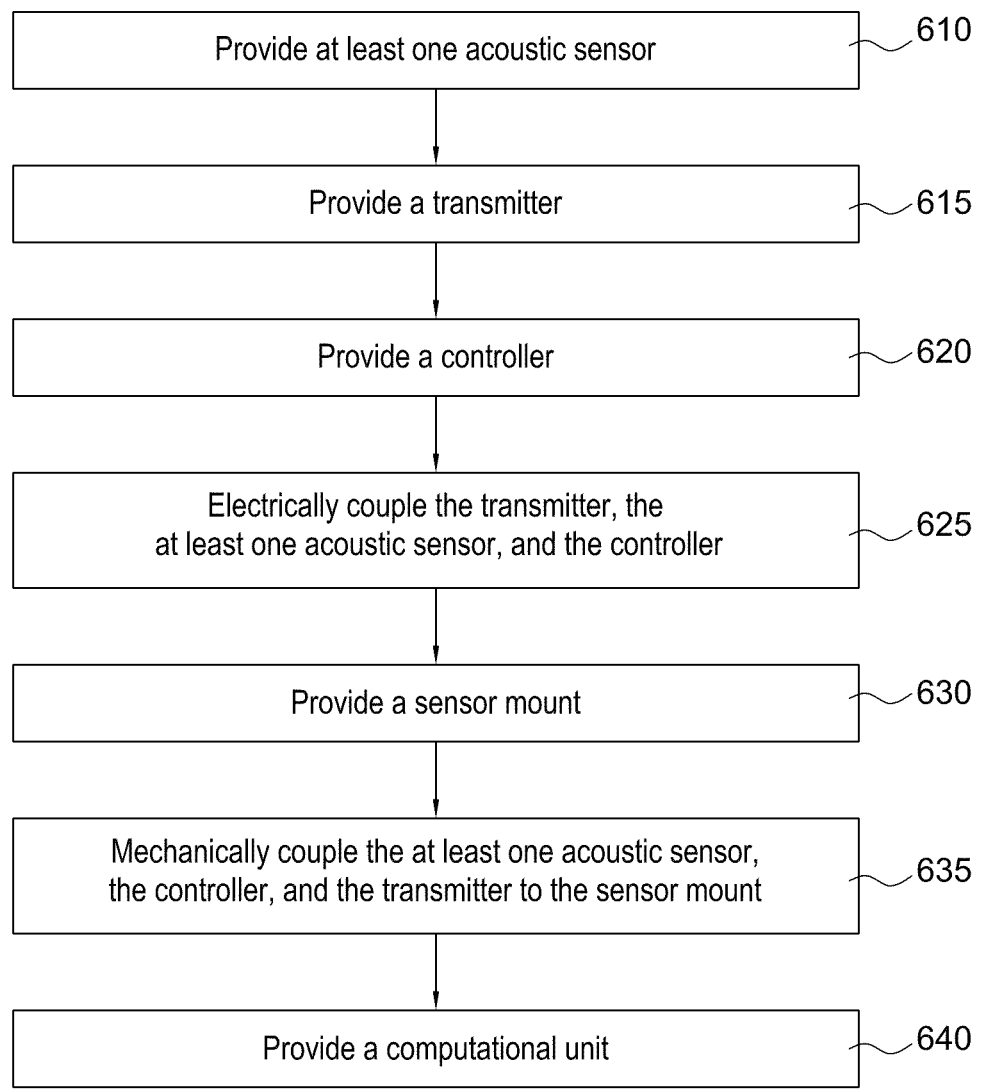
FIG. 6 illustrates a flow chart for an embodiment of a method of providing a gas sensing device, according to an embodiment.

FIG. 6 illustrates a flow chart for an embodiment of a method 600 of providing a gas sensor, according to an embodiment. Method 600 is merely exemplary and is not limited to the embodiments presented herein. Method 600 can be employed in many different embodiments or examples not specifically depicted or described herein. In some embodiments, the activities, the procedures, and/or the processes of method 600 can be performed in the order presented. In other embodiments, the activities, the procedures, and/or the processes of the method 600 can be performed in any other suitable order. In still other embodiments, one or more of the activities, the procedures, and/or the processes in method 600 can be combined or skipped.

Referring to FIG. 6, method 600 includes an activity 610 of providing at least one acoustic sensor. In some embodiments, the acoustic sensor can be configured to detect acoustic signals in a gas regulator and convert the acoustic signals into the one or more first data signals. For example, the at least one acoustic sensor can be similar or identical to acoustic sensor 130 or 530 of FIGS. 1 and 5, respectively. In the same or different examples, activity 610 can include providing a second acoustic sensor. The second acoustic sensor can be located outside the gas regulator, and the acoustic signals detected by the second acoustic sensor can be used for noise cancellation.

Method 600 in FIG. 6 continues with an activity 615 of providing a transmitter. In some embodiments, the transmitter can be configured to transmit the one or more first data signals. As an example, the transmitter can be similar or identical to transmitter 116 of FIG. 1.

Subsequently, method 600 of FIG. 6 includes an activity 620 of providing a controller. As an example, the controller can be similar or identical to controller 118 of FIG. 1.

Next, method 600 of FIG. 6 includes an activity 625 of electrically coupling the transmitter, the at least one acoustic sensor, and the controller. For example, the electrical coupling of the transmitter, the at least one acoustic sensor, and the controller can be similar or identical to the electrical coupling of transmitter 116, acoustic sensor 130, and controller 118, as illustrated in FIG. 1.

Method 600 in FIG. 6 continues with an activity 630 of providing a sensor mount. In some embodiments, the sensor mount can be configured to be coupled to a gas regulator. For example, the sensor mount can be configured to be coupled to a pressure relief vent of a gas regulator. The sensor mount can be similar or identical to sensor mount 132 of FIG. 1 and/or sensor mount 559 of FIG. 5.

Subsequently, method 600 of FIG. 6 includes an activity 635 of mechanically coupling the at least one acoustic sensor, the controller, and the transmitter to the sensor mount. The mechanical coupling of the at least one acoustic sensor, the controller, and the transmitter to sensor mount can be similar or identical to the mechanical coupling of acoustic sensor 130, controller 118, and transmitter 116 to sensor mount 132, as shown in FIGS. 2 and 3.

Next, method 600 of FIG. 6 includes an activity 640 of providing a computational unit. In some embodiments, the computation unit can be configured to determine gas usage by one or more gas appliances using the one or more first data signals. As an example, the computation unit can be similar or identical to computational unit 120 of FIG. 1.

In some examples, activity 640 can include providing the computation unit to include: (a) an event detection module configured to use the two or more first data signals to determine gas usage by one or more gas appliances; (b) a receiver configured to receive the one or more first data signals from the transmitter; (c) a training module configured to determine a relationship between the one or more first data signals and the gas usage by the one or more gas appliances; and (c) a communications module configured to communicate with a user. As an example, the event detection module, the receiver, the training module, the communications module can be similar or identical to event detection module 124, receiver 121, training module 123, and communications module 125, respectively, of FIG. 1.

Figure 7:
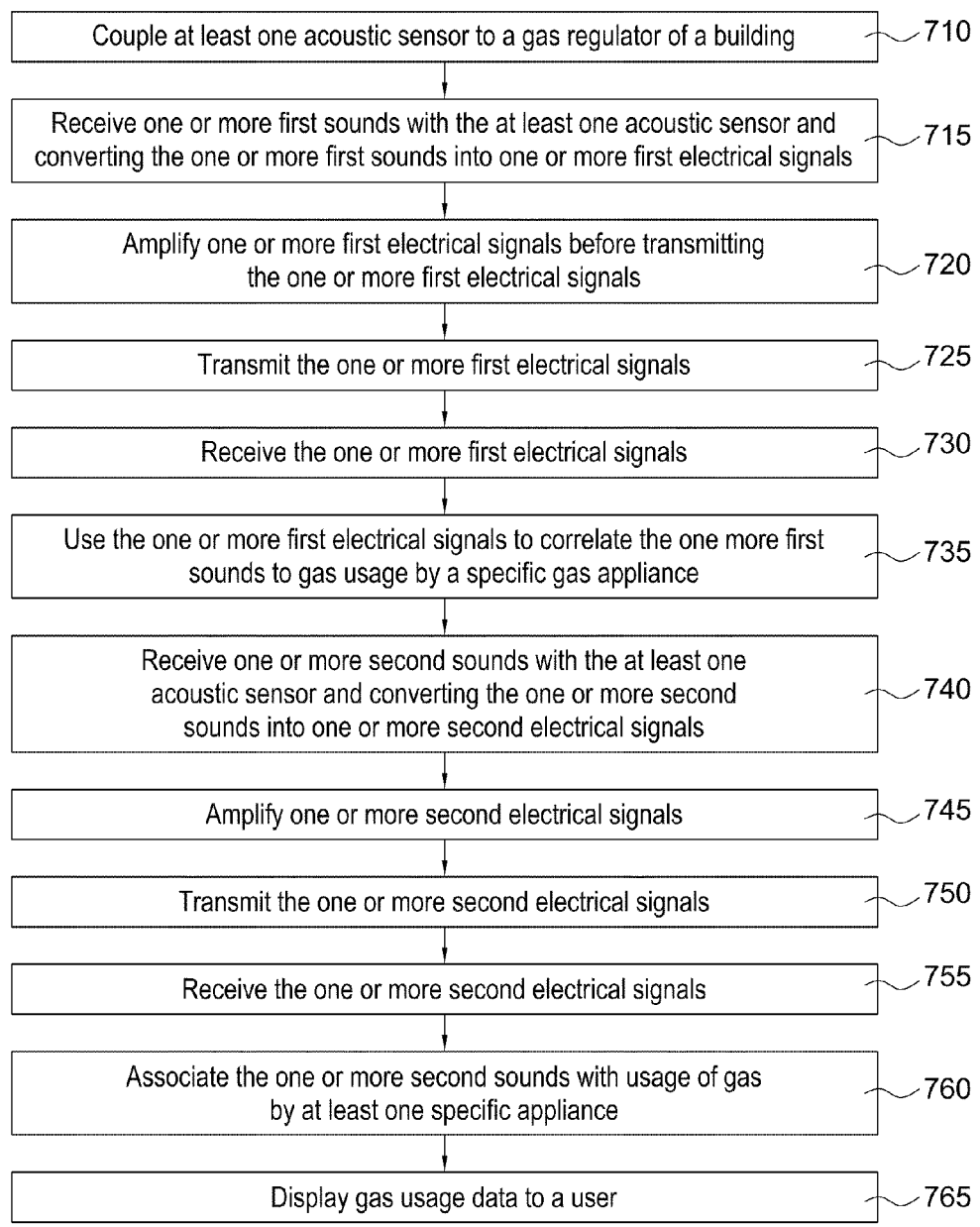
FIG. 7 illustrates a flow chart for an embodiment of a method of detecting usage of gas by one or more gas appliances, according to an embodiment.

FIG. 7 illustrates a flow chart for an embodiment of a method 700 of detecting usage of gas in a building by one or more gas appliances, according to an embodiment. Method 700 is merely exemplary and is not limited to the embodiments presented herein. Method 700 can be employed in many different embodiments or examples not specifically depicted or described herein. In some embodiments, the activities, the procedures, and/or the processes of method 700 can be performed in the order presented. In other embodiments, the activities, the procedures, and/or the processes of the method 700 can be performed in any other suitable order. In still other embodiments, one or more of the activities, the procedures, and/or the processes in method 700 can be combined or skipped.

Referring to FIG. 7, method 700 can includes an activity 710 of coupling at least one acoustic sensor to a gas regulator of a building. The source of gas (whether natural gas or propane) for the building can have a gas regulator to regulate the pressure of the gas entering the building. In some examples, the at least one acoustic sensor can be coupled to a pressure relief vent of the gas regulator.

As an example, the at least one acoustic sensor can be similar or identical to acoustic sensor 130 or 530 of FIGS. 1 and 5, respectively. The gas regulator and the pressure relief vent can be similar or identical to gas regulator 350 and pressure relief vent 451 of FIGS. 3 and 4, respectively. The coupling of the at least one acoustic sensor to the gas regulator can be similar or identical to the coupling of acoustic sensor 130 to gas regulator 350 as illustrated in FIGS. 3 and 4, or the coupling of acoustic sensor 530 to gas regulator 550 as illustrated in FIG. 5. In some examples, the at least one acoustic sensor can be coupled to the gas regulator using a sensor mount (e.g., sensor mount 132 of FIGS. 1-4 or sensor mount 559 of FIG. 5).

Subsequently, method 700 of FIG. 7 includes an activity 715 of receiving the one or more first acoustic signals with the at least one acoustic sensor and converting the one or more first acoustic signals into one or more first electrical signals.

Next, method 700 of FIG. 7 includes an activity 720 of amplifying one or more first electrical signals. In some examples, the one or more first electrical signals can be amplified using an op-amp. As an example, the op-amp can be similar or identical to amplifier 131 of FIG. 1.

Additionally, in some examples, the one or more first electrical signals can be converted from analog to digital signals by an A/D converter (e.g., A/D converter 115) before activity 725.

Method 700 in FIG. 7 continues with an activity 725 of transmitting the one or more first electrical signals. In some embodiments, the one or more first electrical signals can be transmitted using a transmitter. As an example, the transmitter can be similar or identical to transmitter 116 of FIG. 1. In some examples, the transmitter can be a wireless transmitter.

Subsequently, method 700 of FIG. 7 includes an activity 730 of receiving the one or more first electrical signals. In some embodiments, the one or more first electrical signals can be received using a receiver. As an example, the receiver can be similar or identical to receiver 121 of FIG. 1. In some examples, the receiver can be a wireless receiver.

Next, method 700 of FIG. 7 includes an activity 735 of using the one or more first electrical signals to correlate the one more first acoustic signals to gas usage by a specific gas appliance. In some examples, training module 123 (FIG. 1) of computational unit 120 (FIG. 1) can perform a training or calibration process with a user.

Figure 8:
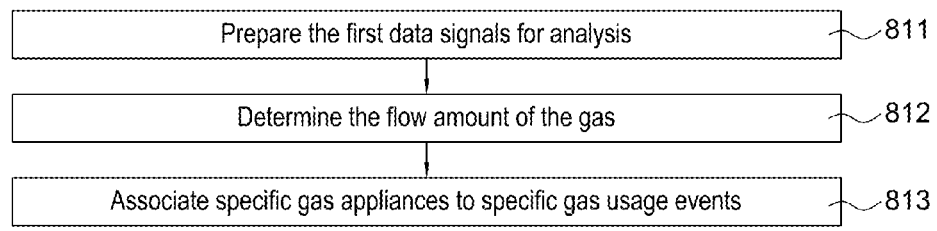
FIG. 8 illustrates a flow chart of an activity of using one or more electrical signals to train a computational unit, according to an embodiment.

FIG. 8 illustrates a flow chart of activity 735 of using the one or more first electrical signals to train a computational unit to correlate the one more first acoustic signals to gas usage by a specific appliance of the one or more gas appliances, according to an embodiment.

The first procedure in activity 735 of FIG. 8 is a procedure 811 of preparing the one or more first data signals for analysis. In some examples, event detection module 124 can clean the first data signals. The first data signals can be raw acoustic files that need cleaning-up before the information about gas usage can be extracted.

Figure 9:
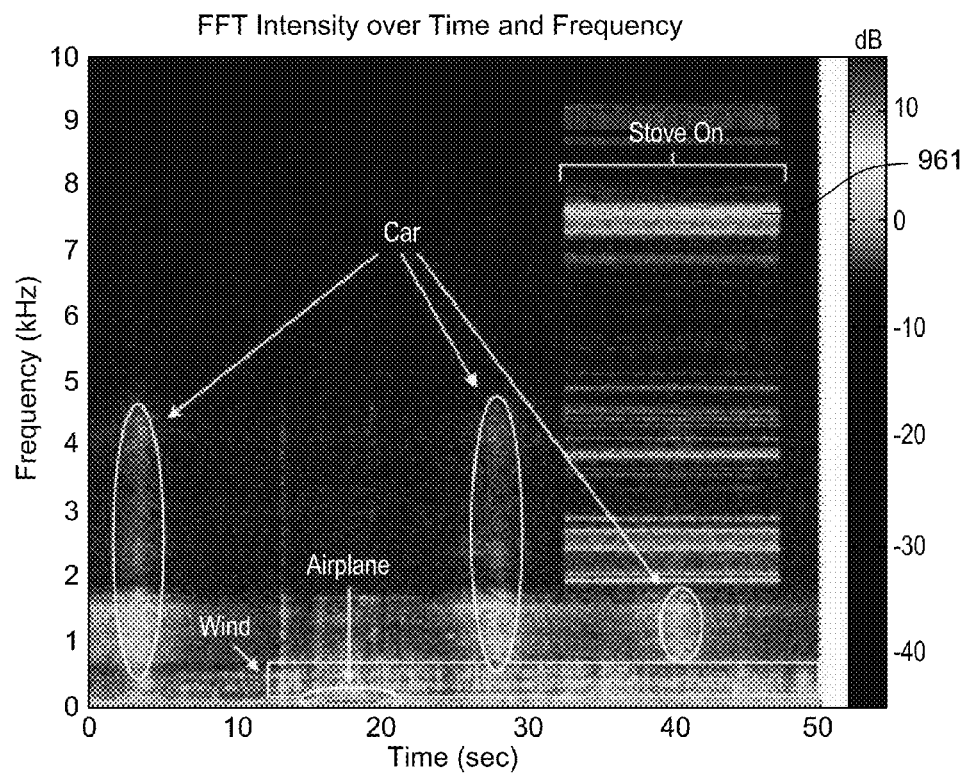
FIG. 9 illustrates a frequency spectrogram of ambient noise and activity in a exemplary gas regulator, according to an embodiment.

For example, the first data signals can be uncompressed WAV (Waveform Audio File Format) recordings. The uncompressed WAV recordings of the pressure regulator can be grouped into non-overlapping time windows, with each window containing one second of data. Using these one-second windows, event detection module 124 can compute a short-time Fourier transform (i.e., a spectrogram) of the acoustic signal. FIG. 9 illustrates the resulting spectrogram 900, in decibels, as a function of both time and frequency. Notice that the acoustic signal 961 primarily occupies a specific frequency in the spectrogram (in FIG. 9, the acoustic signal occurs at 7.5 kHz). The frequency of resonance can change from regulator to regulator, but in general, the resonance frequency stays within the range of 5-9 kHz.

Figure 10:
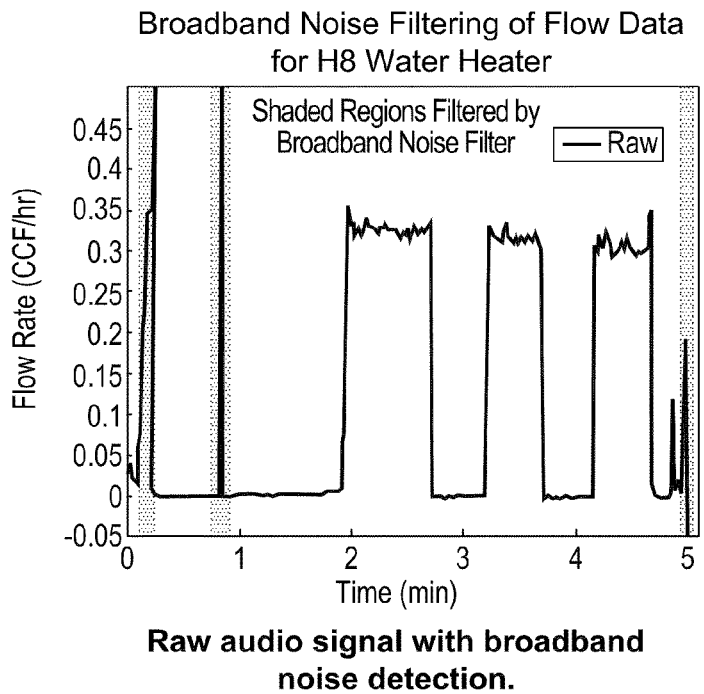
FIG. 10 illustrates a graph of flow rate versus time for raw acoustic signals from an exemplary gas sensing device, according to an embodiment.

Like all acoustic sensor-based approaches, the acoustic signal is susceptible to ambient noise. Fortunately, most of this noise (e.g., footsteps, wind, lawn-mowers) is low frequency (below 4 kHz) noise—note the wind, airplane and car noise labeled in FIG. 9. When noise penetrates the 5-9 kHz range, it often has a wide-band frequency signature, making it easy to identify. In particular, if the mean energy outside the 5-9 kHz range is greater than one tenth of the energy at the resonance frequency, event detection module 124 can discard the data during this time and replace it with the median values from two seconds before and two seconds after the noise event (see FIG. 10).

After removing environmental noise from the spectrogram, event detection module 124 can find the resonant frequency by taking the maximum resonance in the range of 5-9 kHz. Event detection module 124 can extract the magnitudes of the resonant frequency across time to form a time-series vector of values (time, resonant frequency intensity) that correlates directly to flow (see FIGS. 10 and 11). This vector is then smoothed using a moving average filter of five-second length.

Subsequently, activity 735 of FIG. 8 includes a procedure 812 of determining the flow amount of the gas. In some examples, the linear relationship between acoustic intensity and gas flow can be used to estimate the amount of gas used. In other examples, a non-linear mathematical model is used to estimate the amount of gas used.

Figure 12:
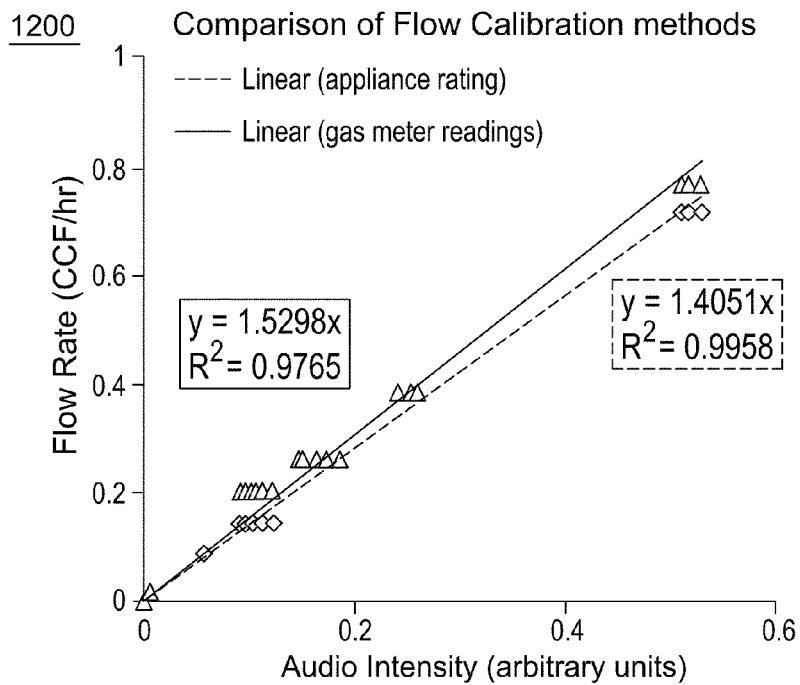
FIG. 12 illustrates a graph of flow rate versus acoustic intensity of data from an exemplary calibration procedure of an exemplary gas sensing device at an exemplary structure, according to an embodiment.

As described above, in some instances the acoustic intensity of gas passing over the pressure regulator valve is linearly related to flow. FIG. 12 illustrates a graph 1200 of flow rate versus acoustic signal intensity of data from an exemplary calibration procedure of an exemplary gas sensing device at an exemplary structure, according to an embodiment. Note that, because of challenges with ground truth data collection, this graph is not perfectly linear, particularly for low-flow values. For this reason a non-linear mathematical model may be applied to estimate the amount of gas used.

Figure 13:
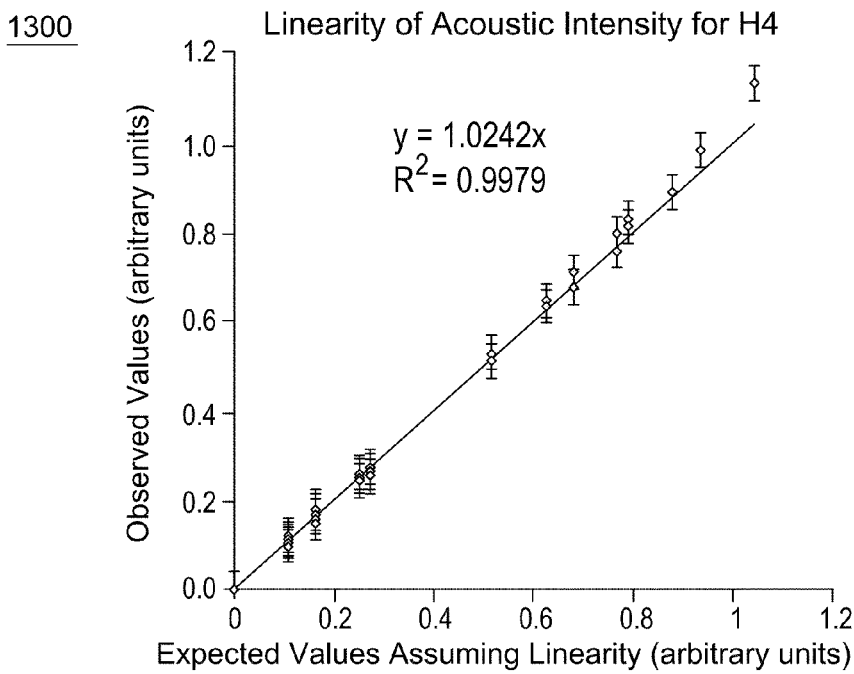
FIG. 13 illustrates a graph showing the linearity of acoustic intensity of data from the exemplary calibration procedure of an exemplary gas sensing device at an exemplary structure, according to an embodiment.

Furthermore, because there is often a linear relationship between acoustic signal intensity and gas flow, the overall acoustic signal intensity of a compound event can be assumed to be the sum of its individually collected acoustic signal intensity parts. This relationship is the same way that overall gas flow should be the sum of the individual flows from each appliance. To test this relationship, the individually collected (single-event) dataset can be compared with the compound event dataset. FIG. 13 illustrates a graph 1300 showing the linearity of acoustic signal intensity of data from the exemplary calibration procedure of an exemplary gas sensing device at an exemplary structure, according to an embodiment. That is, FIG. 13 plots the relationship between the expected value based on summing the individual appliance intensities with measured acoustic signal intensity for both individual and compound events in a test data set. Note that the points lie on a unity slope, indicating that the relationship between audio intensity and rate of gas flow is linear. The slight non-linearity at high gas flow rates can be attributed to the op-amp distorting very high amplitude signals, which can be compensated for by using event detection module 124 (FIG. 1).

Because the relationship between intensity and flow is linear, event detection module 124 can use a simple linear regression to map relative flow (i.e., intensity) of the gas to an absolute gas flow rate, measured in Centum Cubic Feet (CCF or 100 cubic feet) or Therms. The regression requires that gas sensing device 100 has either two points on the flow vs. intensity graph or only one point and assumes that the origin (background noise level) is part of the dataset. Thus, gas sensing device 100 can be calibrated from two appliances with different flow rates or from a single appliance with a variable flow rate. Of course, providing additional data points from additional appliances can improve the regression and, consequently, the gas flow estimate. Three calibration methods can be used to provide the data necessary for associating the relative flow inferred by gas sensing device 100 to absolute consumption (such as in CCF or Therms).

The first method involves reading the gas usage from the structures gas meter and inputting this data using communications module 125 (FIG. 1). The second involves reading the flow ratings on certain appliances, such as the water heater or furnace, and inputting this data using communications module 125 (FIG. 1). Large appliances are typically required by national code to show their gas consumption. This method is particularly useful for homes that use propane, as they do not typically have a gas meter.

The third, less intensive method is to use the measurements reported on the gas bill. Because gas sensing device 100 can record the duration of gas usage and its relative flow, training module 123 and/or event detection module 124 can calculate the total gas consumed over a period of time. In this way, the first gas bill (or even a set of sparse measurements from the gas meter) can be used to calibrate gas sensing device 100 to absolute units of flow. The homeowner would need to enter only the dates of use and aggregate gas usage. Although many gas utilities in the United States charge gas consumption in units of energy (typically in Therms), many gas bills also report the total volume of gas measured by the meter (typically in CCF), enabling the use of this type of calibration method.

Subsequently, activity 735 of FIG. 8 includes a procedure 813 of associating specific gas appliances to specific gas usage events. In some examples, a training module 123 (FIG. 1) can perform a training or calibration process with a user to create this association.

Referring back to FIG. 1, in various embodiments, the calibration process can involve a labeling process where a user of gas sensing device 100 helps relate acoustic signals to specific gas events. In some embodiments, the training sequence involves a user of gas sensing device 100 turning on and turning off each of the gas appliance in the home or building while training module 123 is operating and recording acoustic signals in the gas regulator.

Figure 11:
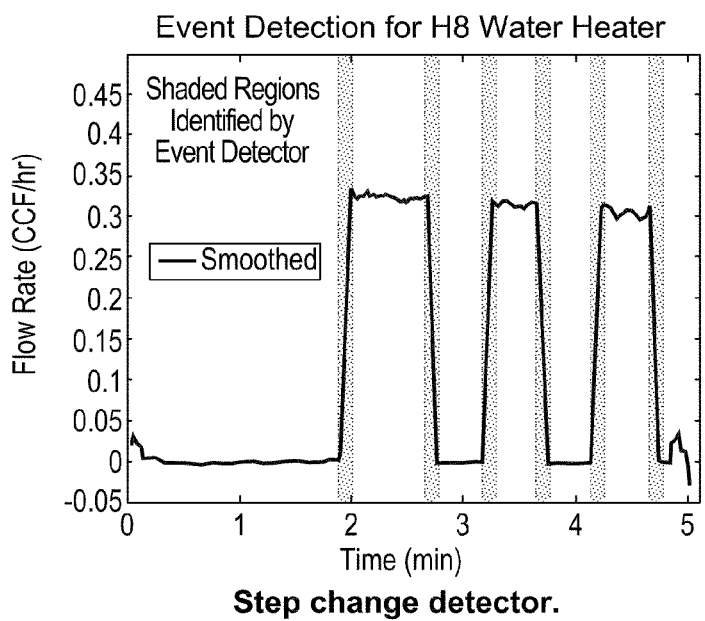
FIG. 11 illustrates a graph of flow rate versus time for smoothed acoustic signals from an exemplary gas sensing device, according to an embodiment.

To identify gas usage events, training module 123 (or event detection module 124) can apply a sliding window step detector, which continuously looks for changes in magnitude of the resonant frequency intensity (see e.g., FIG. 11 or 14). Training module 123 (or event detection module 124) can use the smoothed resonant frequency vector as input. The step detector triggers when it encounters a monotonically increasing or decreasing signal with a rate of change that is greater than a learned or predetermined threshold.

In some examples, the learned threshold is set to an arbitrarily large number and decreased in small steps. For each step, training module 123 (or event detection module 124) can segment a random subset of events that occur in isolation. If the correct number of events is calculated, the threshold is accepted. If not, the threshold is decreased and the process repeats. For example, if the subset contains four events, there should be four step increases and four step decreases segmented. Training module 123 (or event detection module 124) can monotonically decrease the detection threshold until this pattern is seen. In this way, the learned threshold is set with minimal supervision.

After cycling the power on each of the gas appliances, the user can label each gas event detected by training module 123 using communications module 125. For example, if the user: (1) turns on and turns off a gas fireplace; and (2) turns on and turns off each of the four burners on the stove, the first two gas events detected by gas sensing device 100 can be labeled as the gas fireplace being turned on and off, and the next eight gas events can be labeled turning on and turning off each of the four burners of the gas stove. Similarly, a user can cycle on and off the gas on all gas appliances in the house or building and perform a similar label procedure.

In other examples, communications module 125 can include a portion that can run on a mobile electrical device (e.g., an iPhone® device by Apple Computers, Inc. of Cupertino, Calif.) that allows a user to mark with a timestamp when a specific gas event occurred. In these examples, a user can cycle on and off the gas on all gas appliances in the house or building while carrying the electrical device running the part of communications module 125. The user can use communications module 125 to mark when a gas event occurs. For example, while training module 123 is operating and recording gas events, the user can turn on a gas pool heater and press a button on the mobile electrical device which causes the electrical device to record the description of the gas event and the time that event occurred.

Training module 123 can correlate the data recorded by the mobile electrical device and acoustic signal recorded by acoustic sensor 130. In some examples, the mobile electrical device can relay the data immediately (e.g., in real time) to computational unit 120 and, in other examples, the data can be communicated to computational unit 120 after the training process is complete (e.g., in batch mode).

In still further examples, a user can cycle on and off the gas on all gas appliances in the house or building and training module 123 can access acoustic signatures of gas appliances stored in storage module 126 and automatically associate gas events with the acoustic signatures of specific gas appliances. In various embodiments, the user can input information about the gas appliance in the building (e.g., the manufacturer, the module number, and/or serial number) to help training module 123 associate with gas events with acoustic signatures of the appliances in the home. That is, training module 123 can compare the acoustic signals detected by acoustic sensor 130 with stored acoustic signatures of the gas appliances in the building to associate the gas events with specific gas appliances. In some examples, the acoustic signatures of the gas appliance can be provided by a third party (e.g., the manufacturer of gas sensing device 100).

Computational unit 120 can store the results of the association or calibration process in storage module 126. This information can be later used to associate the one or more acoustic signals with usage of gas by a specific gas appliance. After completing the association of specific gas appliances to specific gas usage events, activity 735 of FIG. 8 is complete.

Referring again to FIG. 7, method 700 continues with an activity 740 of receiving one or more second acoustic signals with the at least one acoustic sensor and converting the one or more second acoustic signals into one or more second electrical signals. Activity 740 can be similar or identical to activity 715.

Subsequently, method 700 of FIG. 7 includes an activity 745 of amplifying one or more second electrical signals. Activity 745 can be similar or identical to activity 720.

Next, method 700 of FIG. 7 includes an activity 750 of transmitting the one or more second electrical signals. Activity 750 can be similar or identical to activity 725.

Method 700 in FIG. 7 continues with an activity 755 of receiving the one or more second electrical signals. Activity 755 can be similar or identical to activity 730.

Subsequently, method 700 of FIG. 7 includes an activity 760 of associating the one or more second acoustic signals with usage of gas by at least one specific appliance. In some examples, activity 760 can be considered to be correlating the second gas flow with the usage of gas by at least one specific appliance.

To identify gas usage events, event detection module 124 (FIG. 1) can apply a sliding window step detector, which continuously looks for changes in magnitude of the resonant frequency intensity of the acoustic signal from acoustic sensor 130 (FIG. 1). Event detection module 124 (FIG. 1) uses the smoothed resonant frequency vector as input to appliance identification algorithm. Event detection module 124 (FIG. 1) triggers that a step has occurred when it encounters a monotonically increasing or decreasing signal with a rate of change that is greater than the learned threshold. The threshold for the step is determined for each structure during the calibration process (i.e., in procedure 813 of FIG. 8). For example, FIGS. 10 and 11 include several highlighted regions identified as a step.

After event detection module 124 locates a step change in the acoustic signal from acoustic sensor 130 (FIG. 1), event detection module 124 can extract three features from the signal: (1) the relative magnitude of the step change; (2) the slope of the change-in-flow; and (3) the rise or fall time of the unknown event. The first feature (the step size) provides an estimate of the amount of gas the appliance consumes. This feature is useful in disambiguating appliances that have fixed flow rates (e.g., a water heater typically uses less gas than a furnace). The step size is also useful in disambiguating appliances that have variable flow (e.g., a stove or fireplace) because these systems are designed to turn on at maximum flow during activation, providing a reliable step increase. The second and third features (the step slope and rise time) are useful because electromechanically switched appliances have very steep operating slopes when compared with manually or human-controlled appliances.

Feature vectors are generated for each segmented event and then can be used to build a k nearest neighbor (KNN) model. The KNN model can be used to automatically determine the source of the gas events. Event detection module 124 can apply KNN (k=3) with a Euclidean distance metric and inverse weighting, which is well-suited for this kind of feature vector because a small distance in the N-dimensional space corresponds to gas events having similar flow and slope.

Figure 15:
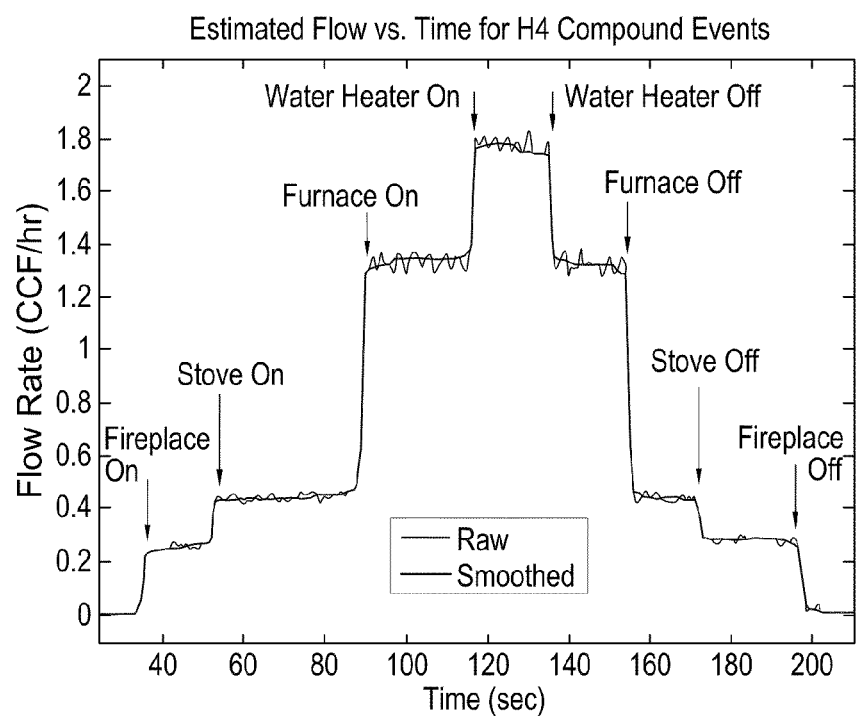
FIG. 15 illustrates another graph of flow rate versus time during an exemplary deployment of an exemplary gas sensing device, according to an embodiment.

FIGS. 14 and 15 illustrate graphs of flow rate versus time during an exemplary deployment of an exemplary gas sensing device, according to an embodiment. For example, FIG. 14 shows a graph 1400 of flow rate versus time during the usage of an exemplary gas stove. FIG. 15 shows a graph 1500 of flow rate versus time during an exemplary compound event. That is, FIG. 15 illustrates an example when a gas fireplace is turned on, a gas stove is turned on, a gas furnace is turned on, a gas water heater is turned on, and then each of these appliances is sequentially turned off.

In some examples, event detection module 124 can use an additional feature of the acoustic signal to identify, for example, furnaces and hot water heaters. Furnaces and hot water heaters produce a low frequency signal or "thump" from their ignition modules when the valve opens and closes (see FIG. 16). These appliances can have two-state solenoid valves to mechanically control the flow of gas, producing a characteristic thump as the solenoid slams the valve into position. This thump is easily sensed using acoustic sensor 130 (FIG. 1), and varies significantly between appliances, which may be used to help differentiate similar gas events.

Unfortunately, acoustic sensor 130 also picks up substantial low frequency noise from people walking outside the home, cars passing by, or other sources from the ambient environment. This makes feature extraction at these frequency levels potentially unreliable. Noise cancelling hardware and procedures can help alleviate this problem. However, instead of probing the lower frequencies for features continuously, event detection module 124 can use the low frequency analysis to disambiguate appliances that cannot reliably be distinguished based solely on flow. For example, the low frequency thumping feature would help to disambiguate a furnace from a gas fireplace, which were sometimes confused for one another in some of the tests of gas sensing device 100.

Finally, method 700 of FIG. 7 includes an activity 765 of displaying the gas usage to a user. In some examples, communications module 125 can display the gas usage data to the user. The data can be displayed in a variety of forms. In some embodiments, the gas usage of each of the gas appliances in the structure for a specific time period can be presented to the user in chart or graph form. For example, a graph can be shown similar to FIG. 14 or 15 can be provided to the user showing gas usage of one or more gas appliances versus time. In some embodiment, the gas usage can be displayed in real-time.

The results of testing of gas sensing device 100 are presented herein. To evaluate the accuracy of gas sensing device 100, a total dataset with 496 gas events was collected over nine homes and five separate appliance types (furnace, water heater, stove, fireplace, and pool heater). Of the 496 gas events, 175 were recorded in isolation and 321 were recorded in compound. The results of these tests show gas sensing device 100 can reliably detect and classify individual appliances with an average overall accuracy of 95.1%.

Data was collected and labeled in nine different homes of varying size and age located in four cities (see Table 1 of FIG. 17). Each house contained a varying level of background noise depending on the locality (proximity to a freeway, sidewalk traffic, etc.). In each house, all of the available gas appliances including furnace, hot water heater, stove, fireplace (with both manual and electric starters), and a pool heater were tested. Although the focus was on natural gas appliances, gas sensing device 100 was also tested at one house that used propane (i.e., H5 in Table 1 of FIG. 17). For each dataset, a training procedure was performed when the timestamp of turning on and off an appliance was noted. This data served as ground truth labels for evaluating this approach.

All of the data was collected and initially processed using a soundcard from the deployment laptops. The acoustic signal was sampled at 22,050 samples per second, enabling frequency analysis on the entire frequency range of the acoustic sensor. The raw data was recorded in an uncompressed WAV file using a 16-bit integer to represent each sample.

A predefined experimental procedure was followed to ensure that the data was consistent across deployment sites.

For each home, the sensor was attached to the relief vent on the gas regulator, as shown in FIGS. 3 and 4. Each gas appliance was individually turned on for a minimum of 15 seconds and then turned off. This process was repeated at least three times for each appliance. This procedure allowed acquisition of a clean dataset where each appliance was the only gas device on in the entire house.

Many gas devices do not provide a mechanism to control the amount of gas flow—the device is simply on or off (furnaces, water heaters, dryers and some fireplaces). For all of the devices for which the flow could be controlled, the device was slowly adjusted through each flow level to capture the effect of variable rate devices. For example, with gas stoves, we would ramp a single burner from maximum to minimum flow and back again (FIG. 14).

In addition to testing each appliance individually, data was collected involving more realistic scenarios in which more than one gas appliance was in use simultaneously (e.g., we would activate the furnace, water heater, and stove). These compound events are likely to be a common occurrence in any home and thus require special attention. To simulate compound events, multiple gas appliances were turned on at 15-second intervals up to four appliances at a time. FIG. 15 shows data collected from a compound event test.

Flow rate information was also collected for both automatically controlled (furnace and water heater) and manually controlled (stove and fireplace) gas appliances. Two methods were used for collecting ground truth gas flow: the natural gas meter and gas appliance labels/manuals, neither of which, unfortunately, provided perfectly accurate ground truth. Although natural gas meters do indeed provide measurements of gas flow, they are not designed to visualize accurate data about instantaneous flow. Even when a constant rate of gas is flowing, gas meter dials would commonly stutter and then later jump as much as a whole turn. To mitigate these effects, flow measurement data was collected over longer periods—typically four minutes or more, which corresponds to at least two cubic feet of gas—and the results averaged to obtain flow rate. This method was used on all homes except H5, which used unmetered propane.

As an alternative to the gas meter, consumption information listed on the gas appliance (or its manual) was used for ground truth. Most large appliances are directly labeled with their power consumption (typically in BTU/hr). Using this method provides estimates for the gas consumption for individual appliances. However, the power consumption obtained from the appliance documentation cannot simply be converted into a gas flow rate as this conversion varies with temperature, pressure, and humidity. Therefore, this method of calibration can only give rough estimates of usage. For homes in which there is no meter (e.g. propane gas homes), this method may be the only method to estimate the flow. For this analysis, this method was used on H5, the only residence using unmetered propane.

To evaluate the accuracy of event detection algorithm (i.e., activity 760 of FIG. 7), each gas appliance event in the dataset (including both single and compound events) was iterated. The output of the event detection algorithm was compared to the human created labels for each event. Gas sensing device 100 was able to correctly detect 98.22% (second column in Table 2 of FIG. 18) of all gas events, even in the presence of considerable ambient noise. For example, leaf blowers, passing cars, and speech were present in many of the datasets, but were not the cause of any failures. In fact, all homes, with the exception of H5, had 100% accuracy. H5, however, is a special case—it is the only home in the dataset that used propane rather than utility supplied natural gas. Unlike natural gas meters, which rely on a single pressure regulator to stabilize incoming gas, propane homes use two regulators (for safety and efficiency reasons). Because these two regulators do not regulate the pressure proportionally, the quantity of gas flow cannot accurately be determined by monitoring only one regulator. The gas stove events, for example, were completely missed on four separate trials.

Once a gas event is detected and isolated, event detection module 124 (FIG. 1) identifies the source of the event. To test the accuracy of the appliance classification algorithm, a 10-fold cross validation experiment was run across each detected gas event for every home. The third column in Table 2 of FIG. 18 shows the results of this experiment. The aggregate accuracy across all homes was 95.1% and the worst performing home, H5, was still above 85% accuracy. Again, the issue with H5 was with the intensity of the acoustic signal when monitoring only one of the two propane gas regulators.

Upon further analysis it was observed that 75% of the time, the water heater was misclassified as a furnace. As previously discussed, there is a characteristic low frequency signal or "thump" that can be used to differentiate furnace and water heater events and improve the accuracy of the classification of these two appliances.

Note that the data was labeled according to individual appliance, not appliance type. This enabled investigation into whether gas sensing device 100 could automatically distinguish between appliances of the same type, but in different locations in the home. The H2 dataset, for example, contained two different fireplaces that were correctly classified as such with 100% accuracy.

The 10-fold cross validation shows that the particular KNN-based classifier performed well at correctly classifying gas events down to the source appliance. However, in actual real-world deployment scenarios, the training data will likely be smaller. That is, a homeowner would likely be willing to provide only one example use of each appliance. To test this sort of scenario, one or two individual gas events for each appliance were used for training and the rest of the dataset was used as test data. These results are presented in the far right column of Table 2 of FIG. 18 and the last two columns in Table 3 of FIG. 19.

The low sensing accuracy in H9 in this test is the result of the introduction of non-linearity to the sensed signal, which affected both H8 and H9. The induced non-linearity in the dataset made it impossible to find a calibration subset that effectively represented all data collected. As a result, step increases during compound events were not representative of the trained step increases. After thorough analysis, it was found that this was due to the low dynamic range of the op-amp.

Also, it was noticed that as more gas appliances are running simultaneously (i.e., higher overall flow), the noise is also amplified, which explains some of the misclassifications for compounded events (especially small loads). Unlike the minimal training set results, H9 performs well in cross validation. This performance can be explained by the much larger amount of training data. Cross validation randomly selects 90% of total instances for training and rest for testing in each fold. This cross validation results in a classifier that learns from the nonlinear instances too, resulting in a more robust model.

Figure 20:
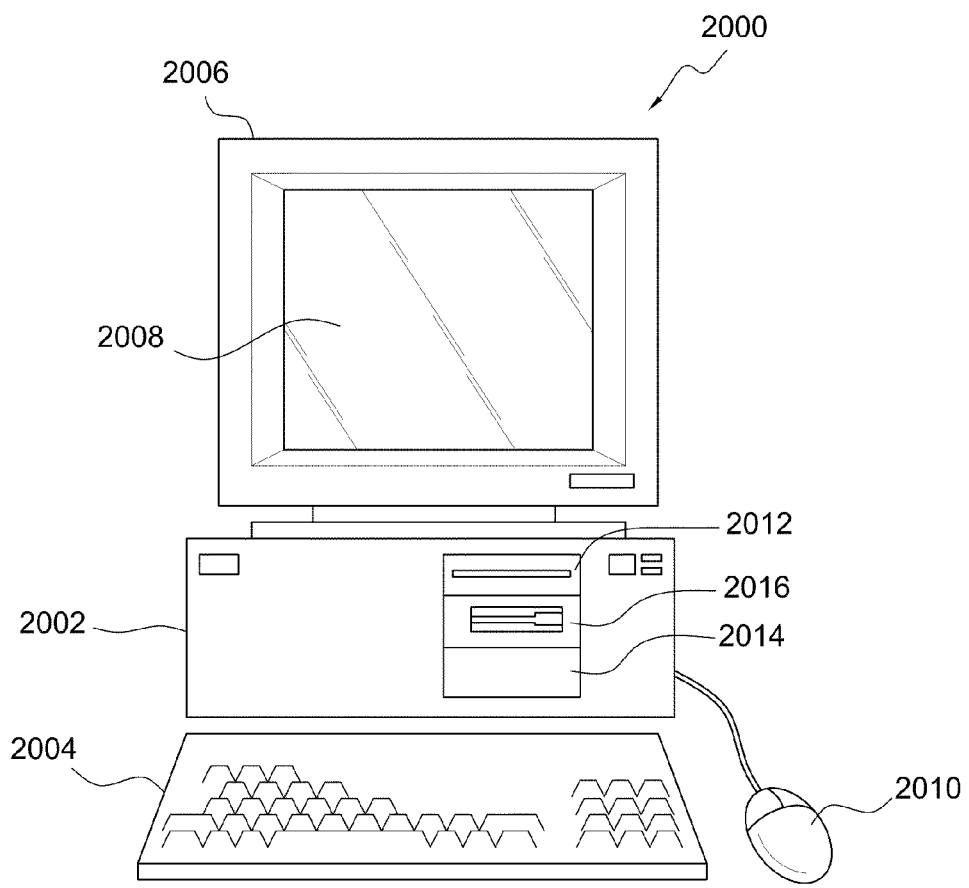
FIG. 20 illustrates a computer that is suitable for implementing an embodiment of the computational unit of FIG. 1.
Figure 21:
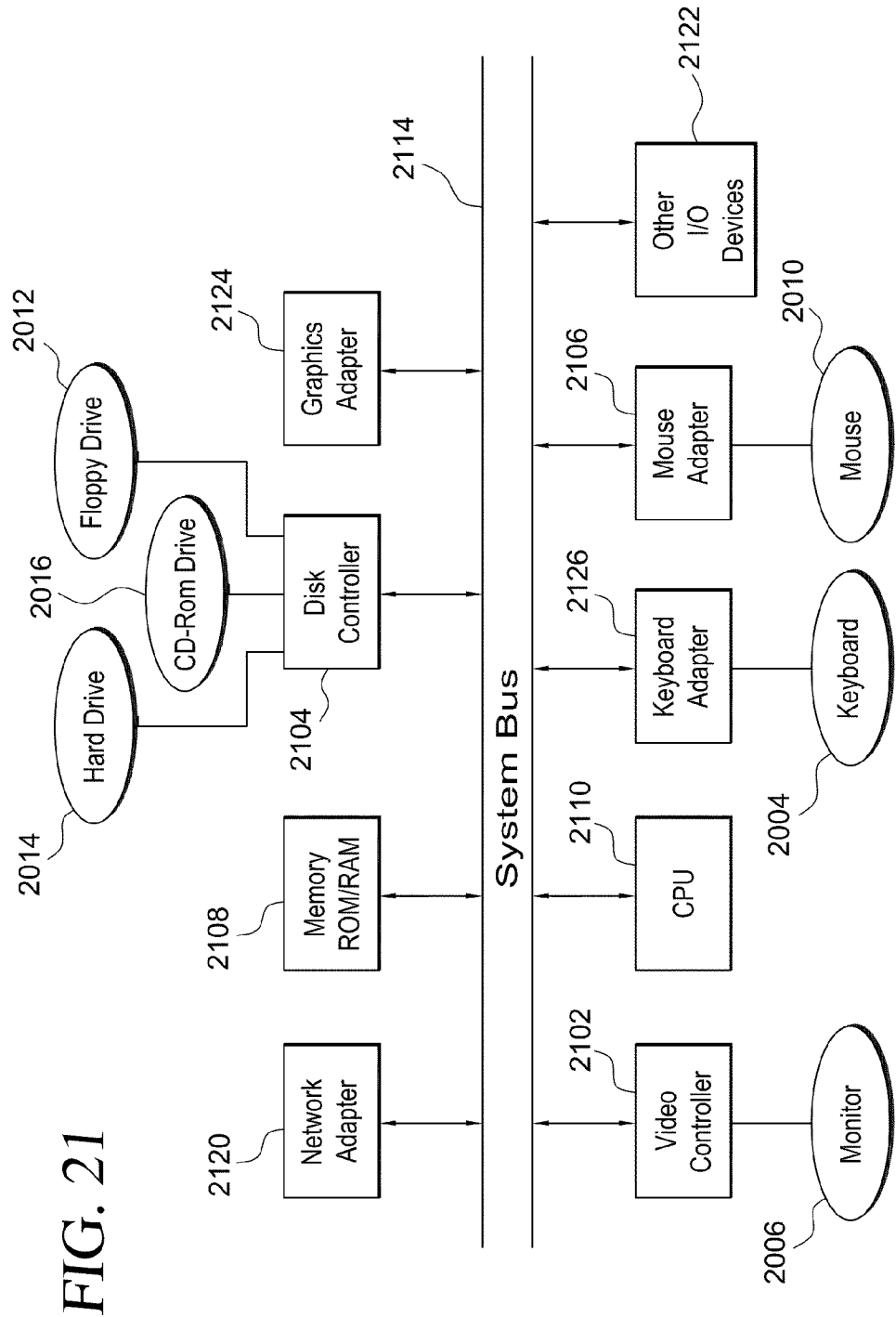
FIG. 21 illustrates a representative block diagram of an example of the elements included in the circuit boards inside the chassis of the computer of FIG. 20.

FIG. 20 illustrates a computer 2000 that is suitable for implementing an embodiment of at least a portion of computational unit 120 (FIG. 1). Computer 2000 includes a chassis 2002 containing one or more circuit boards (not shown), a floppy drive 2012, a Compact Disc Read-Only Memory (CD-ROM) and/or Digital Video Disc (DVD) drive 2016, and a hard drive 2014. A representative block diagram of the elements included on the circuit boards inside chassis 2002 is shown in FIG. 21. A central processing unit (CPU) 2110 in FIG. 21 is coupled to a system bus 2114 in FIG. 21. In various embodiments, the architecture of CPU 1710 can be compliant with any of a variety of commercially distributed architecture families including the ARM (advanced RISC (reduced instruction set) computing machine), MIPS (microprocessor without interlocked pipeline stages), RS/6000 family, the Motorola 68000 family, or the Intel x86 family.

System bus 2114 also is coupled to memory 2108 that includes both read only memory (ROM) and random access memory (RAM). Non-volatile portions of memory 2108 or the ROM can be encoded with a boot code sequence suitable for restoring computer 2000 (FIG. 20) to a functional state after a system reset. In addition, memory 2108 can include microcode such as a Basic Input-Output System (BIOS). In some examples, memory 2108 can include storage module 126 (FIG. 1). In some examples, storage module 126 (FIG. 1) can include memory 2108, floppy drive 2012, hard drive 2014, and/or CD-ROM or DVD drive 2016.

In the depicted embodiment of FIG. 21, various I/O devices such as a disk controller 2104, a graphics adapter 2124, a video controller 2102, a keyboard adapter 2126, a mouse adapter 2106, a network adapter 2120, and other I/O devices 2122 can be coupled to system bus 2114. Keyboard adapter 2126 and mouse adapter 2106 are coupled to a keyboard 2004 (FIGS. 20 and 21) and a mouse 2010 (FIGS. 20 and 21), respectively, of computer 2000 (FIG. 20). While graphics adapter 2124 and video controller 2102 are indicated as distinct units in FIG. 21, video controller 2102 can be integrated into graphics adapter 2124, or vice versa in other embodiments. Video controller 2102 is suitable for refreshing a monitor 2006 (FIGS. 20 and 21) to display images on a screen 2008 (FIG. 20) of computer 2000 (FIG. 20). Disk controller 2104 can control hard drive 2014 (FIGS. 20 and 21), floppy disc drive 2012 (FIGS. 20 and 21), and CD-ROM or DVD drive 2016 (FIGS. 20 and 21). In other embodiments, distinct units can be used to control each of these devices separately.

Although many other components of computer 2000 (FIG. 20) are not shown, such components and their interconnection are well-known to those of ordinary skill in the art. Accordingly, further details concerning the construction and composition of computer 2000 and the circuit boards inside chassis 2002 (FIG. 20) need not be discussed herein.

When computer 2000 in FIG. 20 is running, program instructions stored on a floppy disc in floppy disc drive 2012, on a CD-ROM or DVD in CD-ROM and/or DVD drive 2016, on hard drive 2014, or in memory 2108 (FIG. 21) are executed by CPU 2110 (FIG. 21). A portion of the program instructions, stored on these devices, can be suitable for carrying out method 700 (FIG. 7) as described previously with respect to FIGS. 1-5 and 7-18.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that activities 610, 615, 620, 625, 630, 635 and 640 of FIG. 6, activities 710, 715, 720, 725, 730, 735, 740, 745, 750, 755, 760, and 765 of FIG. 7, and procedures 811-813 may be comprised of many different activities, procedures and be performed by many different modules, in many different orders that any element of FIG. 1 may be modified and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An apparatus configured to detect gas usage by two or more gas appliances the apparatus comprises:
   a processing module configured to run on a computational unit; and
   a sensing unit configured to be coupled to a gas regulator, the sensing unit comprising:
      at least one acoustic sensor configured to detect two or more acoustic signals produced by the gas regulator and convert the two or more acoustic signals into one or more first digital acoustic data signals; and
      a transmitter electrically coupled to the at least one acoustic sensor and configured to transmit the one or more first digital acoustic data signals to the computational unit,
   wherein:
      the processing module is configured to use the one or more first digital acoustic data signals to determine an individual gas usage by each of the two or more gas appliances coupled to the gas regulator based at least in part upon changes in a magnitude of a resonant frequency intensity of the one or more first digital acoustic data signals.

2. The apparatus of claim 1, wherein:
   the processing module is further configured to determine the individual gas usage by at least one of a gas stove, a water heater, or a gas furnace by disaggregating the two or more acoustic signals produced by the gas regulator; and
   the two or more gas appliances comprise the gas stow, the water heater, and the gas furnace.

3. The apparatus of claim 1, wherein:
   the processing module is further configured to remove data signals caused by ambient noise from the one or more first digital acoustic data signals.

4. The apparatus of claim 1, wherein:
   the processing module is further configured to apply at least one of a Fourier transform or a band pass filter to the one or more first digital acoustic data signals.

5. The apparatus of claim 1, further comprising:
   a wire, wherein:
   the computational unit comprises a receiver; and
   the receiver of the computational unit is electrically coupled to the transmitter of the sensing unit using the wire; and the transmitter of the sensing unit is configured to transmit the one or more first digital acoustic data signals over the wire.

6. The apparatus of claim 1, wherein:
the transmitter of the sensing unit comprises a wireless transmitter; and
the computational unit comprises:
a wireless receiver configured to receive the one or more first digital acoustic data signals from the wireless transmitter of the sensing unit.

7. The apparatus of claim 1, wherein:
the at least one acoustic sensor comprises an omni-directional microphone.

8. The apparatus of claim 1, wherein:
the processing module comprises:
a training module; and
an event detection module:
the training module is configured to correlate a first gas event with at least a first one of the one or more first digital acoustic data signals and to correlate a second as event with at least a second one of the one or more first digital acoustic data signals;
the event detection module is configured to use the one or more first digital acoustic data signals to identify one or more first gas appliances responsible for the individual gas usage; and
the two or more gas appliances comprise the one or more first gas appliances.

9. The apparatus of claim 8, wherein:
the processing module further comprises:
a communications module configured to communicate with a user.

10. The apparatus of claim 1, wherein:
the gas regulator comprises a pressure relief vent;
the at least one acoustic sensor is configured to detect the two or more acoustic signals in the pressure relief vent of the gas regulator; and
the sensing unit is configured to couple to the pressure relief vent of the gas regulator.

11. The apparatus of claim 1, wherein:
the at least one acoustic sensor is a component of an integrated circuit.

12. The apparatus of claim 1, wherein:
the at least one acoustic sensor is mechanically coupled to a housing of the gas regulator.

13. The apparatus of claim 1, wherein:
the at least one acoustic sensor comprises of at least one of the following; an electric microphone, a piezoelectric sensor, an acousto-electric transducer, a micro-electro-mechanical sensor, or an ultrasonic microphone.

14. The apparatus of claim 1, wherein:
the processing module is further configured to determine a total amount of gas usage by all active gas appliances coupled to the gas regulator based upon the two or more acoustic signals produced by the gas regulator; and
the active gas appliances comprise the two or more gas appliances.

15. A method of detecting usage of a. gas in a building, the building having a gas regulator with a pressure relief vent, the method comprising:
using at least one acoustic sensor to receive one or more first acoustic signals from the pressure relief vent of the gas regulator;
converting the one or more first acoustic signals from the pressure relief vent of the as regulator into one or more first digital acoustic data signals;

determining a total amount of the gas being used b all active gas appliances coupled to the gas regulator based upon the one or more first digital acoustic data signals; and
determining a first amount of the gas being used by to first gas appliance based at least in part upon changes in a magnitude of a resonant frequency intensity of the one or more first digital acoustic data signals.

16. The method of claim 15 further comprising:
using the at least one acoustic sensor to receive one or more second acoustic signals;
converting the one or more second acoustic signals into one or more second electrical signals; and
using the one or more second electrical signals to correlate the one or more second acoustic signals to the usage of the gas by a second gas appliance of the active gas appliances.

17. The method of claim 15 further comprising:
wirelessly transmitting the one or more first digital acoustic data signals; and
before determining the total amount of the gas being used by the active gas appliances, wirelessly receiving the one or more first digital acoustic data signals.

18. The method of claim 15, further comprising:
amplifying the one or more first digital acoustic data signals before determining the total amount of the gas being used by the active gas appliances coupled to the gas regulator.

19. The method of claim 15, further comprising:
coupling the at least one acoustic sensor to the pressure relief vent of the gas regulator.

20. The method of claim 15, further comprising:
using the at least one acoustic sensor to receive one or more second acoustic signals;
converting the one or more second acoustic signals into two or more second electrical signals;
training a training module to correlate a first gas event with at least a first one of the two or more second electrical signals and to correlate a second gas event with at least a second one of the two or more second electrical signals;
training the training module to associate the first gas event with usage of the gas by the first gas appliance; and
training the training module to associate the second gas event with usage of the gas by a second gas appliance, wherein:
the active gas appliances further comprise the second gas appliance.

21. A method of providing a gas sensing device, the method comprising:
providing at least one acoustic sensor configured to detect two or more acoustic signals produced by a gas regulator and to convert the two or more acoustic signals into one or more first digital acoustic data signals;
providing a transmitter configured to transmit the one or more first digital acoustic data signals;
electrically coupling the transmitter to the at least one acoustic sensor;
providing a sensor mount configured to mechanically couple to the gas regulator;
mechanically coupling the at least one acoustic sensor and the transmitter to the sensor mount; and
providing a processing module configured to run on as computational unit, the processing module comprising:
an event detection module configured to use the one or more first digital acoustic data signals to determine a total gas usage by one or more gas appliances coupled to the gas regulator, and to determine an individual gas usage by each of the one or more gas appliances based at least in part upon chances in a magnitude of a resonant frequency intensity of the one or more first digital acoustic data signals.

22. The method of claim 21, further comprising:
providing a receiver configured to receive the one or more first digital acoustic data signals from the transmitter.

23. The method of claim 21, further comprising:
providing the processing module to further comprise:
- a training module configured to determine a relationship between the one or more first digital acoustic data signals and the individual gas usage by each of the one or more gas appliances.

24. A gas regulator unit comprising:
a gas regulator comprising:
- a gas inlet;
- a diaphragm chamber configured to control an amount of gas flowing through the gas regulator;
- a relief valve coupled to the diaphragm chamber; and
- a relief vent coupled to the relief valve;

at least one acoustic sensor configured to detect two or more acoustic signals created by the gas regulator and to convert the two or more acoustic signals into one or more first digital acoustic data signals, the at least one acoustic sensor is located at the gas regulator; and
a processing module configured to run on a computational unit, the processing module configured to use the one or more first digital acoustic data signals to determine individual gas usage by each of two or more gas appliances coupled to the gas regulator based at least in part upon changes in a magnitude of a resonant frequency intensity of the one or more first digital acoustic data signals.

25. The gas regulator unit of claim 24, further comprising:
a transmitter coupled to the at least one acoustic sensor and configured to transmit the one or more first digital acoustic data signals,
wherein:
the computational unit comprises a receiver configured to receive the one or more first digital acoustic data signals from the transmitter.

* * * * *